United States Patent
Nakasaka

(10) Patent No.: US 7,893,929 B2
(45) Date of Patent: Feb. 22, 2011

(54) GAME PROGRAM, GAME DEVICE, AND GAME CONTROL METHOD

(75) Inventor: Noboru Nakasaka, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 722 days.

(21) Appl. No.: 11/936,573

(22) Filed: Nov. 7, 2007

(65) Prior Publication Data

US 2008/0143687 A1 Jun. 19, 2008

(30) Foreign Application Priority Data

Dec. 14, 2006 (JP) .............................. 2006-337287

(51) Int. Cl.
G06F 3/041 (2006.01)
(52) U.S. Cl. ........................................ 345/173; 463/36
(58) Field of Classification Search ......... 345/156–158, 345/173, 174, 179; 178/18.01–18.05; 700/245, 700/260, 261
See application file for complete search history.

(56) References Cited

U.S. PATENT DOCUMENTS

| | | | | |
|---|---|---|---|---|
| 5,481,278 | A * | 1/1996 | Shigematsu et al. ......... | 345/179 |
| 5,550,330 | A * | 8/1996 | Matsuura et al. ......... | 178/18.02 |
| 5,600,765 | A * | 2/1997 | Ando et al. ................. | 345/668 |
| 5,777,605 | A * | 7/1998 | Yoshinobu et al. .......... | 345/173 |
| 5,799,107 | A * | 8/1998 | Fukuchi ...................... | 382/181 |
| 6,645,067 | B1 * | 11/2003 | Okita et al. .................... | 463/7 |
| 7,437,214 | B2 * | 10/2008 | Sabe et al. ................... | 700/245 |
| 2004/0130576 | A1 * | 7/2004 | Fujita et al. ................. | 345/781 |
| 2005/0222709 | A1 * | 10/2005 | Sabe et al. ................... | 700/245 |
| 2006/0184273 | A1 * | 8/2006 | Sawada et al. .............. | 700/245 |
| 2006/0227106 | A1 | 10/2006 | Hashimoto et al. | |

FOREIGN PATENT DOCUMENTS

| | | |
|---|---|---|
| JP | H08-335134 A | 12/1996 |
| JP | 2000-222095 A | 8/2000 |
| JP | 2001-265481 A | 9/2001 |
| JP | 2004-206731 A | 7/2004 |
| JP | 2005-193006 A | 7/2005 |
| JP | 2005-301693 A | 10/2005 |
| JP | 2005-339420 A | 12/2005 |
| JP | 2006-293476 A | 10/2006 |

* cited by examiner

Primary Examiner—Kimnhung Nguyen
(74) Attorney, Agent, or Firm—Global IP Counselors, LLP

(57) ABSTRACT

To be able to smoothly instruct a command from a command input region, in this game program, a plurality of commands is assigned to a command icon. Then, when a touch pen touched a contact input type of monitor, the coordinate data of the contact start position SS is recognized. Then, in the case that the coordinate data of the contact start position SS matched a coordinate data inside the command icon, the coordinate data of a subsequent contact position is recognized. Then, in the case that the coordinate data of the subsequent contact position did not match the coordinate data of the contact start position SS, based on the coordinate data of the contact start position SS and the coordinate data of the subsequent contact position, based on the track that is specified by the contact start position SS and the subsequent contact position of the touch pen 40, one command out of any of the plurality of commands is executed.

13 Claims, 13 Drawing Sheets

| command icons | commands |
|---|---|
| A | run slowly<br>run normally<br>run quickly |
| B | muscle training intensity: low<br>muscle training intensity: normal<br>muscle training intensity: high |
| ⋮ | ⋮ |
| H | batting practice: easy<br>batting practice: normal<br>batting practice hard |

*Fig. 6*

| track length | command |
|---|---|
| equal to or greater than 0.1 cm and less than 0.5 cm | run slowly |
| equal to or greater than 0.5 cm and less than 1.0 cm | run normally |
| equal to or greater than 1.0 cm | run quickly |

| track formation speed data | command |
|---|---|
| less than 0.5 cm/sec | run slowly |
| equal to or greater than 0.5 cm/sec and less than 1.0 cm/sec | run normally |
| equal to or greater than 1.0 cm/sec | run quickly |

| contacting time data | command |
|---|---|
| less than 1 sec | run slowly |
| equal to or greater than 1 sec and less than 3 sec | run normally |
| equal to or greater than 3 sec | run quickly |

*Fig. 10*

| contact frequency data | command |
|---|---|
| once | run slowly |
| twice | run normally |
| three times or more | run quickly |

*Fig. 11*

GAME PROGRAM, GAME DEVICE, AND GAME CONTROL METHOD

CROSS-REFERENCE TO THE RELATED APPLICATIONS

This application claims priority to Japanese Patent Application No. 2006-337287. The entire disclosure of Japanese Patent Application Nos. 2006-337287 is hereby incorporated herein by reference.

BACKGROUND OF THE INVENTION

1. Field of the Invention

The present invention relates to a game program, and in particular, a game program for executing a command that is inputted from a touch input type of monitor into a computer that has the touch input type of monitor. In addition, the present invention relates to a game device that is able to execute a game realized by this game program, and a game control method that is able to control the game realized by the game program via a computer.

2. Description of the Related Art

A variety of video games have been proposed up to now. These video games are to be executed in game devices. For example, a normal game device has a monitor, a game machine main body that is a separate body from the monitor, and an input portion, for example a controller, that is a separate body from the game machine main body. On the controller, a plurality of input buttons are arranged. In addition, a portable game device has a game machine main body, a liquid crystal monitor arranged on approximately the center portion of the game machine main body, and an input portion, for example a plurality of input buttons arranged on both sides of the liquid crystal monitor. In this kind of game device, it is possible to make various commands to characters that are shown on the monitor, by operating the input portion.

For example, considering a case that a baseball game is executed in a portable game device (refer to non-patent publication 1: Power Pro Kun Pocket 8, Konami Corporation, Nintendo DS version, Dec. 1, 2005). When a baseball game is executed, on the liquid crystal monitor, not only the characters of the players are shown, but also icons for making commands to the player characters, icons necessary for processing an event, and the like are shown. Commands for the player characters and commands for events and the like are assigned to each of these icons. Therefore, when an icon is selected by a player operating an input button, the command assigned to the selected icon is executed.

SUMMARY OF THE INVENTION

In the above described kind of baseball game, various command icons (command input region) are displayed on the monitor. Then, with the player selecting an icon, the command assigned to the selected icon is executed. In this kind of baseball game, normally, one command is assigned to one icon. Therefore, in order to instruct a plurality of commands to a player character, it is necessary to have a plurality of icons. However, since the size of the monitor in a portable game device is limited, it is possible that the plurality of icons will not be able to be displayed on the same screen as the screen where the player character is displayed, in the state that the player character is displayed.

In order to solve this problem, instead of simultaneously displaying the player character and the plurality of command icons, it is possible to consider using a configuration (individual display) of increasing the number of command icons being displayed by separately preparing a player character display screen and a plurality of command icon display screens, a configuration (hierarchical display) of displaying a plurality of icons by showing the icons that are related in hierarchical display when a command icon is selected, and the like. However, in the individual display, hierarchical display, and the like, when looking for the intended icon, it is necessary to go back and forth between each of the layers and go to and from the screens. Therefore, in the individual display and the hierarchical display, it is difficult for a player to smoothly instruct a command from the icons.

On the other hand, in order to solve the above described problem, by reducing the size of the icon, it may be possible to display many icons. However, since the size of the icon needs to be set within the range that the player is able to identify the design of the icon, it is not possible to reduce the size of the icon more than a certain amount. Therefore, in order to display a plurality of icons on the monitor, it is highly possible that a screen switching display, a hierarchical display, or the like has to be used. Thus, when the screen switching display, the hierarchical display, or the like is used, with the same reason as described above, it is difficult for a player to smoothly instruct a command from the icon.

The object of the present invention is to allow a command to be smoothly instructed from the command input region.

The game program according to a first aspect is a program for executing commands, that are inputted from a contact input type of monitor via a computer that has the contact input type of monitor. In this game program stored in a computer-readable medium, the following functions are implemented.

(1) A command input region display function displays a command input region in order to input the command on the contact input type of monitor.

(2) A command assignment function makes the control portion execute a process of assigning the plurality of commands in the command input region.

(3) A signal recognition function makes the control portion recognize a contact signal from the contact input type of monitor, when an instruction means touched the contact input type of monitor.

(4) A contact start position recognition function makes the control portion recognize the coordinate data of a contact start position on the contact input type of monitor, corresponding to a contact start signal sent out from the contact input type of monitor, when the contact of the instruction means on the contact input type of monitor started.

(5) A contact start position judgment function makes the control portion judge whether or not the coordinate data of the contact start position on the contact input type of monitor matches a coordinate data inside the command input region.

(6) A subsequent contact position recognition function makes the control portion recognize the coordinate data of the subsequent contact position on the contact input type of monitor, corresponding to a subsequent contact signal sent out from the contact input type of monitor following the contact start signal, in the case that the control portion judged that the coordinate data of the contact start position matches a coordinate data inside the command input region.

(7) A subsequent contact position judgment function makes the control portion judge whether or not the coordinate data of the subsequent contact position matches the coordinate data of the contact start position.

(8) A track recognition function makes the control portion recognize the track that is specified by the contact start position and the subsequent contact position of the instruction means, based on the coordinate data of the contact start position and the coordinate data of the subsequent contact position, in the case that the control portion judged that the coordinate data of the subsequent contact position does not match the coordinate data of the contact start position.

(9) A track command recognition function makes the control portion recognize one command out of any of the plurality of commands, based on the track.

(10) A command execution function makes the control portion execute a process for executing one command out of any of the plurality of commands.

In this game program, in the command input region display function, the command input region for inputting a command is displayed on the contact input type of monitor. In the command assignment function, the process of assigning a plurality of commands to the command input region is executed by the control portion. In the signal recognition function, when the instruction means touched the contact input type of monitor, the contact signal from the contact input type of monitor is recognized in the control portion. In the contact start position recognition function, when the contact of the instruction means on the contact input type of monitor started, the coordinate data of the contact start position on the contact input type of monitor, corresponding to the contact start signal sent out from the contact input type of monitor is recognized in the control portion. In the contact start position judgment function, whether or not the coordinate data of the contact start position on the contact input type of monitor matches a coordinate data inside the command input region is judged by the control portion. In the subsequent contact position recognition function, in the case that the control portion judged that the coordinate data of the contact start position matches a coordinate data inside the command input region, the coordinate data of the subsequent contact position on the contact input type of monitor, corresponding to the subsequent contact signal sent out from the contact input type of monitor following the contact start signal, is recognized in the control portion. In the subsequent contact position judgment function, whether or not the coordinate data of the subsequent contact position matches the coordinate data of the contact start position is judged by the control portion. In the track recognition function, in the case that the control portion judged that the coordinate data of the subsequent contact position does not match the coordinate data of the contact start position, based on the coordinate data of the contact start position and the coordinate data of the subsequent contact position, the track specified by the contact start position and the subsequent contact position of the instruction means is recognized in the control portion. In the track command recognition function, based on the track, one command out of any of the plurality of commands is recognized in the control portion. In the command execution function, the process for executing one command out of any of the plurality of commands is executed by the control portion.

For example, in the case that this game program is executed in a baseball game, the icon (command input region) for inputting a player character command, an event command, and the like, are displayed on the contact input type of monitor. Then, a process of assigning the above mentioned commands to the icon is executed by the control portion. Then, when an instruction means (instruction device), such as a touch pen, a finger, and the like touched the contact input type of monitor, a contact signal from the contact input type of monitor is recognized in the control portion. Then, when the contact of the instruction means on the contact input type of monitor started, the coordinate data of the contact start position on the contact input type of monitor, corresponding to the contact start signal sent out from the contact input type of monitor, are recognized in the control portion. Then, whether or not the coordinate data of the contact start position on the contact input type of monitor matches a coordinate data of the inside region of the icon is judged by the control portion. Then, in the case that the control portion judged that the coordinate data of the contact start position matches a coordinate data of the inside region of the icon, the coordinate data of the subsequent contact position on the contact input type of monitor, corresponding to the subsequent contact signal sent out from the contact input type of monitor following the contact start signal is recognized in the control portion. Then, whether or not the coordinate data of the subsequent contact position of the instruction means matches the coordinate data of the contact start position of the instruction means is judged by the control portion. Then, in the case that the control portion judged that the coordinate data of the subsequent contact position of the instruction means does not match the coordinate data of the contact start position of the instruction means, based on the coordinate data of the contact start position and the coordinate data of the subsequent contact position, the track specified by the contact start position and the subsequent contact position of the instruction means, for example, the track of the instruction means that moved on the monitor, is recognized in the control portion. Then, based on this track, one command out of any of the plurality of commands is recognized in the control portion. Then, the process for executing one command out of any of the plurality of commands is executed by the control portion.

More specifically, in the case that the control portion judged that the contact start position of the instruction means is positioned inside the icon, whether or not the contact position of the instruction means is positioned on the same position as the contact start position of the instruction means is judged by the control portion. Then, in the case that the contact position of the instruction means is positioned on a different position from the contact start position of the instruction means, the track of the instruction means on the monitor is recognized in the control portion. Then, the command corresponding to this track is recognized in the control portion, and the process for executing this command is executed by the control portion. By doing so, a player is able to execute the command corresponding to the track formed when moving the instruction means on the monitor, only by moving the instruction means on the monitor after the instruction means is positioned inside the icon in the beginning. In other words, a player is able to smoothly instruct a command from the icon.

The game program according to a second aspect is the game program according to the first aspect, and is a program for executing commands, that are inputted from the contact input type of monitor, via a computer that has the contact input type of monitor. This game program further implements the following functions.

(11) A track length recognition function makes the control portion recognize the length of the track specified by the contact start position and the subsequent contact position of the instruction means, based on the coordinate data of the contact start position and the coordinate data of the subsequent contact position, in the case that the control portion judged that the coordinate data of the subsequent contact position does not match the coordinate data of the contact start position.

(12) A track length command recognition function makes the control portion recognize one command out of any of the plurality of commands, based on the length of the track.

In this game program, in the track length recognition function, in the case that the control portion judged that the coordinate data of the subsequent contact position does not match the coordinate data of the contact start position, based on the coordinate data of the contact start position and the coordinate data of the subsequent contact position, the length of the track specified by the contact start position and the subsequent contact position of the instruction means is recognized in the control portion. In the track length command recognition function, based on the length of the track, one command out of any of the plurality of commands is recognized in the control portion.

For example, in the case that this game program is executed in a baseball game, when the control portion judged that the coordinate data of the subsequent contact position does not match the coordinate data of the contact start position of the instruction means, based on the coordinate data of the contact start position of the instruction means and the coordinate data of the subsequent contact position of the instruction means, the length of the track that is specified by the contact start position of the instruction means and the subsequent contact position of the instruction means, for example, the length of the track of the instruction means that moved on the monitor, is recognized in the control portion. Then, based on this length of the track, one command out of any of the plurality of commands is recognized in the control portion.

In this case, when a player moved the instruction means on the monitor after positioning the instruction means inside the icon in the beginning, the length of the track of the instruction means that moved on the monitor is recognized in the control portion. Then, based on this length of the track, one command out of any of the plurality of commands is recognized in the control portion. Then, in the above described command execution function, the process for executing one command out of any of the plurality of commands is executed by the control portion. By doing so, a player is able to execute the command corresponding to the length of the track formed when the instruction means was moved on the monitor, by only moving the instruction means on the monitor after positioning the instruction means inside the icon in the beginning. In other words, the player is able to smoothly instruct a command from the icon.

The game program according to a third aspect is the game program according to the first aspect, and is a program for executing commands, that are inputted from the contact input type of monitor, via a computer that has the contact input type of monitor. This game program further implements the following functions.

(13) A track speed recognition function makes the control portion recognize the formation speed of the track specified by the contact start position and the subsequent contact position of the instruction means, based on the coordinate data of the contact start position and the coordinate data of the subsequent contact position, in the case that the control portion judged that the coordinate data of the subsequent contact position does not match the coordinate data of the contact start position.

(14) A track formation speed command recognition function makes the control portion recognize one command out of any of the plurality of commands, based on the formation speed of the track.

In this game program, in the track speed recognition function, in the case that the control portion judged that the coordinate data of the subsequent contact position does not match the coordinate data of the contact start position, based on the coordinate data of the contact start position and the coordinate data of the subsequent contact position, the formation speed of the track that is specified by the contact start position and the subsequent contact position of the instruction means is recognized in the control portion. In the track formation speed command recognition function, based on the formation speed of the track, one command out of any of the plurality of commands is recognized in the control portion.

For example, in the case that this game program is executed in a baseball game, when the control portion judged that the coordinate data of the subsequent contact position of the instruction means does not match the coordinate data of the contact start position of the instruction means, based on the coordinate data of the contact start position of the instruction means and the coordinate data of the subsequent contact position of the instruction means, the formation speed of the track that is specified by the contact start position and the subsequent contact position of the instruction means, for example, the moving speed of the instruction means on the monitor, is recognized in the control portion. Then, based on the formation speed of this track, one command out of any of the plurality of commands is recognized in the control portion.

In this case, when a player moved the instruction means on the monitor after positioning the instruction means inside the icon in the beginning, the moving speed of the instruction means on the monitor is recognized in the control portion. Then, based on this moving speed, one command out of any of the plurality of commands is recognized in the control portion. Then, in the above described command execution function, the process for executing one command out of any of the plurality of commands is executed by the control portion. By doing so, a player is able to execute the command corresponding to the moving speed of the instruction means when the instruction means was moved on the monitor, by only moving the instruction means on the monitor after positioning the instruction means inside the icon in the beginning. In other words, the player is able to smoothly instruct a command from the icon.

The game program according to a fourth aspect is the game program according to the first aspect, and is a program for executing commands, that are inputted from the contact input type of monitor, via a computer that has the contact input type of monitor. This game program further implements the following function.

(13) A contacting time recognition function makes the control portion recognize the contacting time of the instruction means on the contact input type of monitor, in the case that the control portion judged that the coordinate data of the subsequent contact position matches the coordinate data of the contact start position.

(14) A contacting time command recognition function makes the control portion recognize one command out of any of the plurality of commands, based on the contacting time.

In this game program, in the contacting time recognition function, in the case that the control portion judged that the coordinate data of the subsequent contact position matches the coordinate data of the contact start position, the contacting time of the instruction means to the contact input type of monitor is recognized in the control portion. In the contacting time command recognition function, based on the contacting time, one command out of any of the plurality of commands is recognized in the control portion.

For example, in the case that this game program is executed in a baseball game, when the control portion judged that the coordinate data of the subsequent contact position of the instruction means matches the coordinate data of the contact start position of the instruction means, the contacting time of the instruction means to the contact input type of monitor is recognized in the control portion. Then, based on this contacting time, one command out of any of the plurality of commands is recognized in the control portion.

In this case, if a player maintains the state of positioning the instruction means from the beginning inside the icon, the contacting time of the instruction means to the contact input type of monitor is recognized in the control portion. Then, based on this contacting time, one command out of any of the plurality of commands is recognized in the control portion. Then, in the above described command execution function, the process for executing one command out of any of the plurality of commands is executed by the control portion. By doing so, the player is able to execute the command corresponding to the contacting time of the instruction means, by only positioning the instruction means inside the icon in the beginning and maintaining the instruction means inside the icon. In other words, the player is able to smoothly instruct a command from the icon.

In the game program according to a fifth aspect, which is the game program according to any of the first to the fourth aspects, the coordinate data of the subsequent contact position is identical to at least one of the data of either a coordinate data of the inside region of the icon or a coordinate data of the outside region of the icon.

In this case, since the coordinate data of the subsequent contact position is identical to at least one of the data of either a coordinate data of the inside region of the icon or a coordinate data of the outside region of the icon, as long as the player positions the instruction means inside the icon in the beginning, it is possible for the control portion to recognize the coordinate data of the subsequent contact position, whether the contact position (subsequent contact position) of the instruction means after that is inside or outside the icon. In other words, whether the subsequent contact position is inside or outside the icon, it is possible for the player to instruct a command from the icon.

The game program according to a sixth aspect is a program for executing commands, that are inputted from a contact input type of monitor, via a computer that has the contact input type of monitor. This game program implements the following functions.

(1) A command input region display function displays a command input region in order to input the command on the contact input type of monitor.

(2) A command assignment function makes the control portion execute a process of assigning the plurality of commands in the command input region.

(3) A signal recognition function makes the control portion recognize a contact signal from the contact input type of monitor, when an instruction means touched the contact input type of monitor.

(4) A contact start position recognition function makes the control portion recognize the coordinate data of a contact start position on the contact input type of monitor, corresponding to a contact start signal sent out from the contact input type of monitor, when the contact of the instruction means on the contact input type of monitor started.

(5) A contact start position judgment function makes the control portion judge whether or not the coordinate data of the contact start position on the contact input type of monitor matches a coordinate data inside the command input region.

(6) A subsequent contact position recognition function makes the control portion recognize the coordinate data of the subsequent contact position on the contact input type of monitor, corresponding to a subsequent contact signal sent out from the contact input type of monitor following the contact start signal, in the case that the control portion judged that the coordinate data of the contact start position matches a coordinate data inside the command input region.

(7) A continuous recognition judgment function makes the control portion judge whether or not the coordinate data of the subsequent contact position on the contact input type of monitor is intermittently recognized in the control portion.

(8) A contact frequency calculation function makes the control portion execute a process of calculating the number of times the contact start position and the subsequent contact position are recognized in the control portion, in the case that the control portion judged that the subsequent contact position on the contact input type of monitor is intermittently recognized in the control portion.

(9) A contact frequency command recognition function makes the control portion recognize one command out of any of the plurality of commands, based on the contact frequency.

(10) A command execution function makes the control portion execute a process for executing one command out of any of the plurality of commands.

In this game program, in the command input region display function, the command input region for inputting a command is displayed on the contact input type of monitor. In the command assignment function, the process of assigning the plurality of commands to the command input region is executed by the control portion. In the signal recognition function, when the instruction means touched the contact input type of monitor, the contact signal from the contact input type of monitor is recognized in the control portion. In the contact start position recognition function, when the contact of the instruction means on the contact input type of monitor started, the coordinate data of the contact start position on the contact input type of monitor, corresponding to the contact start signal sent out from the contact input type of monitor is recognized in the control portion. In the contact start position judgment function, whether or not the coordinate data of the contact start position on the contact input type of monitor matches a coordinate data inside the command input region is judged by the control portion. In the subsequent contact position recognition function, in the case that the control portion judged that the coordinate data of the contact start position matches a coordinate data inside the command input region, the coordinate data of the subsequent contact position on the contact input type of monitor, corresponding to the subsequent contact signal sent out from the contact input type of monitor following the contact start signal is recognized in the control portion. In the continuous recognition judgment function, whether or not the coordinate data of the subsequent contact position on the contact input type of monitor is intermittently recognized in the control portion is judged by the control portion. In the contact frequency calculation function, in the case that the control portion judged that the subsequent contact position on the contact input type of monitor is intermittently recognized in the control portion, the process of calculating the number of times the contact start position and the subsequent contact position recognized in the control portion is executed by the control portion. In the contact frequency command recognition function, based on the contact frequency, one command out of any of the plurality of commands is recognized in the control portion. In the command execution function, the process for executing one command out of any of the plurality of commands is executed by the control portion.

For example, in the case that this game program is executed in a baseball game, whether or not the subsequent contact position of the instruction means on the contact input type of monitor is intermittently recognized in the control portion is judged by the control portion. Then, in the case that the control portion judged that the subsequent contact position of the instruction means on the contact input type of monitor is intermittently recognized in the control portion, the process of calculating the number of times the contact start position of the instruction means and the subsequent contact position of the instruction means are recognized in the control portion is executed by the control portion. Then, based on this contact frequency, one command out of any of the plurality of commands is recognized in the control portion.

In this case, when a player touched the monitor again with the instruction means after positioned the instruction means inside the icon in the beginning, the process of calculating the contact frequency of the instruction means is executed by the control portion. Then, based on this contact frequency, one command out of any of the plurality of commands is recognized in the control portion. Then, in the above described command execution function, the process for executing one command out of any of the plurality of commands is executed by the control portion. By doing so, a player is able to execute the command corresponding to the contact frequency of the instruction means, by only touching the monitor again with the instruction means after positioned the instruction means inside the icon in the beginning. In other words, a player is able to smoothly instruct a command from the icon.

The game device according to a seventh aspect has a contact input type of monitor. In this game device, commands inputted from the contact input type of monitor are executed. This game device has a command input region display means, a command assignment means, a signal recognition means, a contact start position recognition means, a contact start position judgment means, a subsequent contact position recognition means, a subsequent contact position judgment means, a track recognition means, a track command recognition means, and a command execution means. The command input region display means displays a command input region in order to input the command on the contact input type of monitor. The command assignment means makes the control portion execute a process of assigning the plurality of commands in the command input region. The signal recognition means makes the control portion recognize a contact signal from the contact input type of monitor, when an instruction means touched the contact input type of monitor. The contact start position recognition means makes the control portion recognize the coordinate data of a contact start position on the contact input type of monitor, corresponding to a contact start signal sent out from the contact input type of monitor, when the contact of the instruction means on the contact input type of monitor started. The contact start position judgment means makes the control portion judge whether or not the coordinate data of the contact start position on the contact input type of monitor matches a coordinate data inside the command input region. The subsequent contact position recognition means makes the control portion recognize the coordinate data of the subsequent contact position on the contact input type of monitor, corresponding to a subsequent contact signal sent out from the contact input type of monitor following the contact start signal, in the case that the control portion judged that the coordinate data of the contact start position matches a coordinate data inside the command input region. The subsequent contact position judgment means makes the control portion judge whether or not the coordinate data of the subsequent contact position matches the coordinate data of the contact start position. The track recognition means makes the control portion recognize the track that is specified by the contact start position and the subsequent contact position of the instruction means, based on the coordinate data of the contact start position and the coordinate data of the subsequent contact position, in the case that the control portion judged that the coordinate data of the subsequent contact position does not match the coordinate data of the contact start position. The track command recognition means makes the control portion recognize one command out of any of the plurality of commands, based on the track. The command execution means makes the control portion execute a process for executing one command out of any of the plurality of commands.

The game control method according to an eighth aspect is a game control method for executing commands, that are inputted from a contact input type of monitor, via a computer that has the contact input type of monitor. This game control method has a command input region display step, a command assignment step, a signal recognition step, a contact start position recognition step, a contact start position judgment step, a subsequent contact position recognition step, a subsequent contact position judgment step, a track recognition step, a track command recognition step, and a command execution step. The command input region display step displays a command input region in order to input the command on the contact input type of monitor. The command assignment step makes the control portion execute a process of assigning the plurality of commands in the command input region. The signal recognition step makes the control portion recognize a contact signal from the contact input type of monitor, when an instruction means touched the contact input type of monitor. The contact start position recognition step makes the control portion recognize the coordinate data of a contact start position on the contact input type of monitor, corresponding to a contact start signal sent out from the contact input type of monitor, when the contact of the instruction means on the contact input type of monitor started. The contact start position judgment step makes the control portion judge whether or not the coordinate data of the contact start position on the contact input type of monitor matches a coordinate data inside the command input region. The subsequent contact position recognition step makes the control portion recognize the coordinate data of the subsequent contact position on the contact input type of monitor, corresponding to a subsequent contact signal sent out from the contact input type of monitor following the contact start signal, in the case that the control portion judged that the coordinate data of the contact start position matches a coordinate data inside the command input region. The subsequent contact position judgment step makes the control portion judge whether or not the coordinate data of the subsequent contact position matches the coordinate data of the contact start position. The track recognition step makes the control portion recognize the track that is specified by the contact start position and the subsequent contact position of the instruction means, based on the coordinate data of the contact start position and the coordinate data of the subsequent contact position, in the case that the control portion judged that the coordinate data of the subsequent contact position does not match the coordinate data of the contact start position. The track command recognition step makes the control portion recognize one command out of any of the plurality of commands, based on the track. The command execution step makes the control portion execute a process for executing one command out of any of the plurality of commands.

In the present invention, in the case that the control portion judged that the contact start position of the instruction means is positioned inside the command input region, whether or not the contact position of the instruction means is positioned on the same position as the contact start position of the instruction means is judged by the control portion. Then, in the case that the contact position of the instruction means is positioned on a different position from the contact start position of the instruction means, the track of the instruction means on the monitor is recognized in the control portion. Then, the command corresponding to this track is recognized in the control portion, and the process for executing this command is executed by the control portion. By doing so, a player is able to execute the command corresponding to the track formed when the instruction means moved on the monitor, by only moving the instruction means on the monitor after positioning the instruction means inside the command input region in the beginning. In other words, it is possible for a player to smoothly instruct a command from the command input region.

BRIEF DESCRIPTION OF THE DRAWINGS

Referring now to the attached drawings which form a part of this original disclosure:

FIG. 6 shows the corresponding relationships between the command icons and a plurality of commands that are assigned to the command icons;

FIG. 10 shows the corresponding relationships between the contacting time data and the commands;

FIG. 11 shows the corresponding relationships between the contact frequency data and the commands;

DESCRIPTION OF THE PREFERRED EMBODIMENTS

Configuration of the Game Device

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
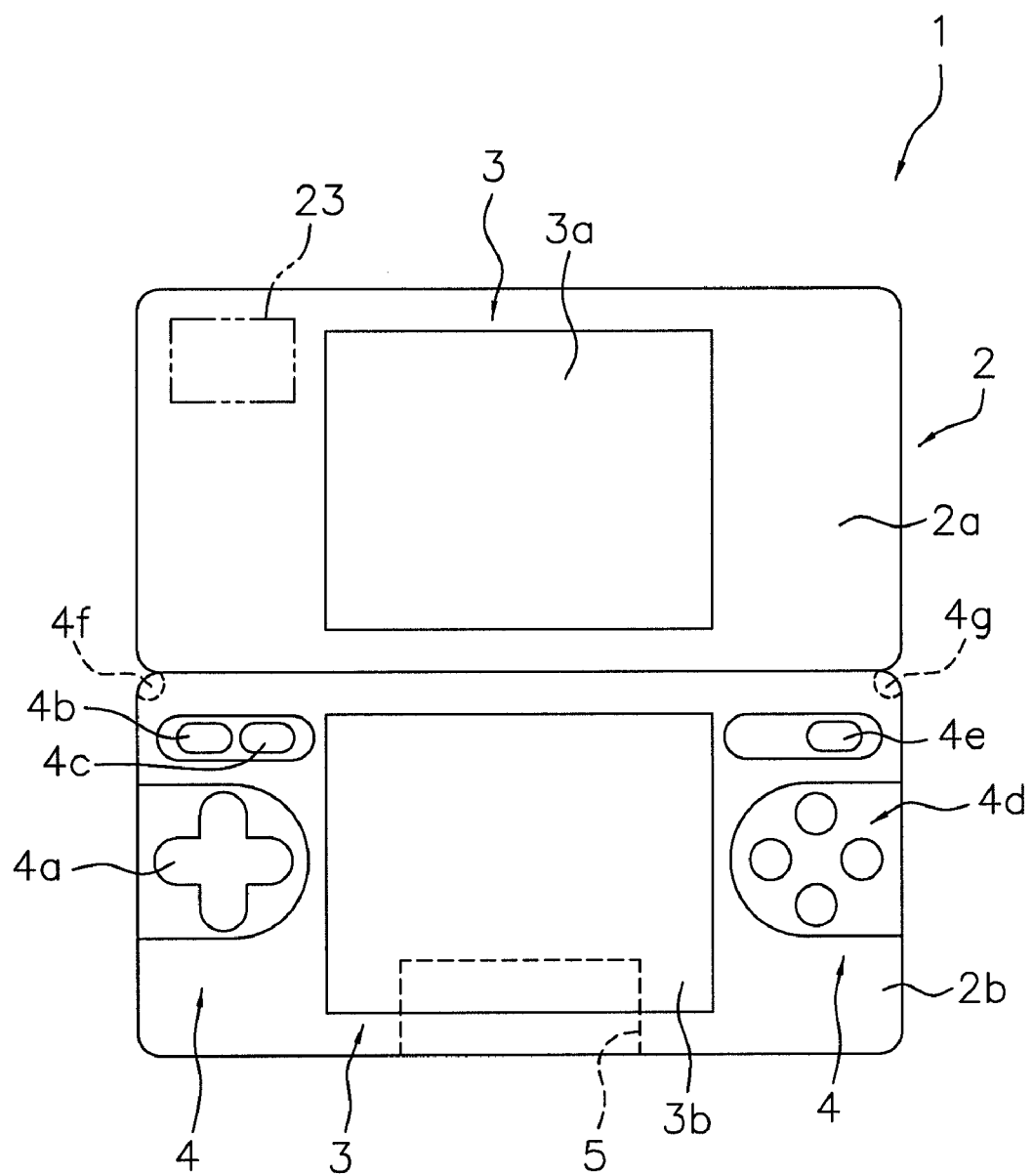
FIG. 1 shows a portable game machine according to one embodiment of the present invention.

FIG. 1 is an external view of a portable game machine 1 as an example of a computer able to adopt the game program of the present invention. In addition, FIG. 2 is a control block diagram as an example of a portable game machine 1.

The portable game machine 1, as shown in FIG. 1, has mainly a main body 2, a liquid crystal monitor 3, input portions 4, a cartridge attachment portion 5, and a communication portion 23. The main body 2 has an upper chassis 2a and a lower chassis 2b. The upper chassis 2a and the lower chassis 2b are connected to be able to freely open and close with respect to one another. The liquid crystal monitor 3 has a first liquid crystal monitor, or an upper liquid crystal monitor 3a, that is arranged on the upper chassis 2a, and a second liquid crystal monitor, or a lower liquid crystal monitor 3b, that is arranged on the lower chassis 2b. Here, for example, the upper liquid crystal monitor 3a is a non-contact input type of monitor, or a non-touch panel type of monitor, and the lower liquid crystal monitor 3b is a touch input type of monitor, or a touch panel type of monitor. The non-touch panel type of monitor has liquid crystal panel, and the touch panel type of monitor has liquid crystal panel and touch panel. On the touch panel type of monitor, the display surface of the liquid crystal panel and the data input surface of the touch panel are formed to be laminated all-in-one. The input portions 4 has a direction indication button 4a in cross shape and arranged in the center portion on the left side of the lower chassis 2b, a select button 4b and a start button 4c arranged on the left and right sides on the left side upper portion of the lower chassis 2b, an instruction button 4d arranged on the center portion on the right side of the lower chassis 2b, a power button 4e arranged on the upper portion on the right side of the lower chassis 2b, and an L button 4f and an R button 4g arranged on the left and right corner portions of the lower chassis 2b. The cartridge attachment portion 5 is arranged on the under side of the lower chassis 2b. On this cartridge attachment portion 5, for example, a cartridge for games can be mounted. The communication portion 23 is housed in the main body 2, for example, the upper chassis 2a. In this communication portion 23, for example, a local wireless network function, a internet connection function by wireless LAN, and the like are provided. In addition, on the game machine 1, a sound volume adjustment button, a earphone jack, and the like are also arranged, but descriptions thereof are omitted.

Figure 2:
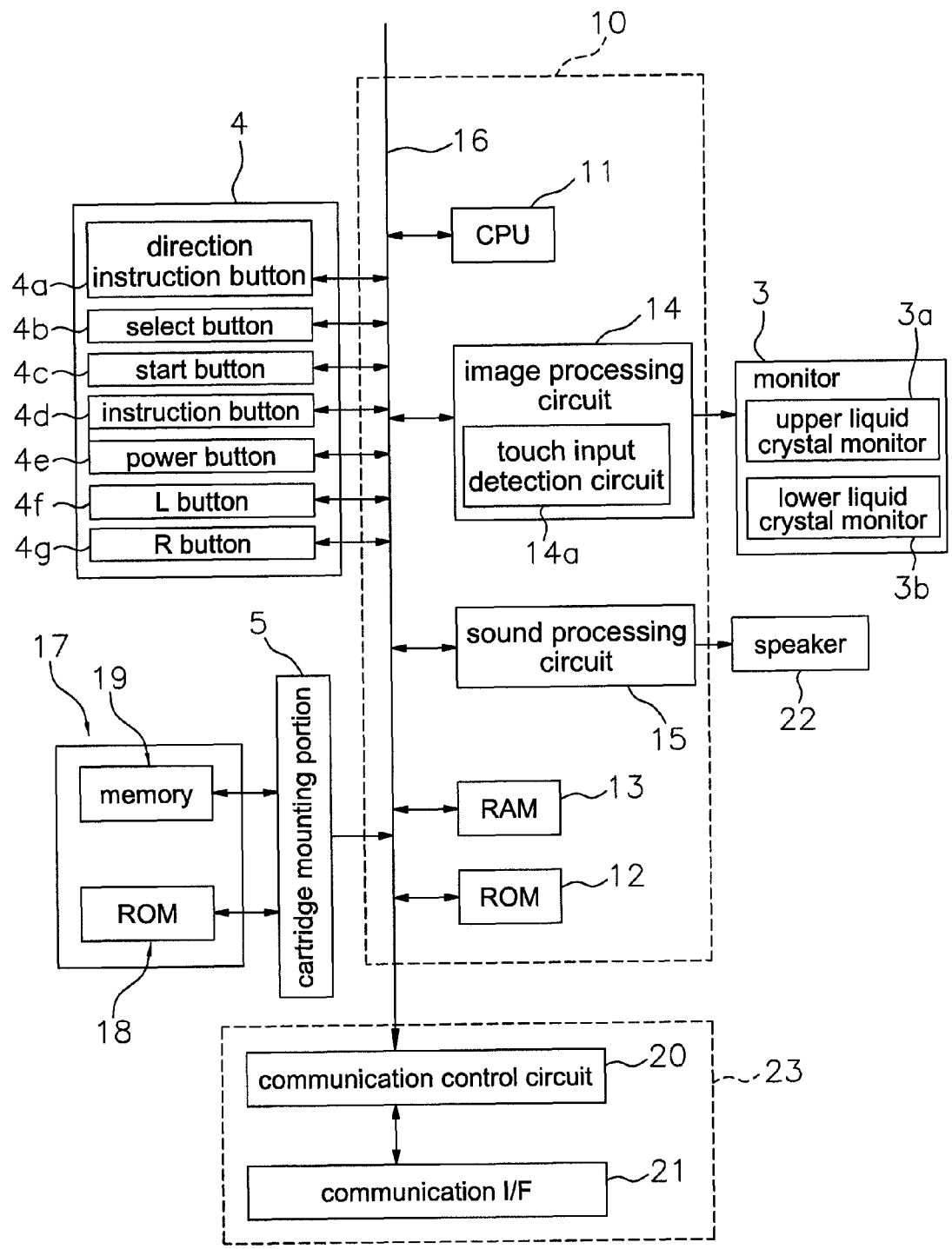
FIG. 2 is a block diagram showing the control of the portable game machine.

The portable game machine 1, as shown in FIG. 2, has a control portion, or a control device 10 in the interior thereof. The control device 10 has a CPU (Central Processing Unit) 11 using microprocessor, a ROM (Read Only Memory) 12 as a main memory device, a RAM (Random Access Memory) 13, an image processing circuit 14, and a sound processing circuit 15. Each of these is connected via a bus 16.

CPU 11 interprets a command from the game program that is stored in a computer readable medium and performs various data processing and controls. The ROM 12 stores programs and the like necessary for the basic controls (for example start-up control) of the game machine 1. The RAM 13 secures a work space for the CPU 11. The image processing circuit 14 controls the liquid crystal monitor 3 according to a drawing instruction from the CPU 11, and displays a predetermined image on at least one of the upper liquid crystal monitor 3a or the lower liquid crystal monitor 3b. In addition, a touch input detection circuit 14a is disposed in the image processing circuit 14. When an instruction means (instruction device), for example a touch pen or a finger and the like, directly contacts the touch panel, a contact signal is provided to the CPU 11 from the touch input detection circuit 14a, and a contact position is recognized in the CPU 11. In addition, when an instruction means directly contacts the touch panel on the position of the object displayed on the liquid crystal panel, a contact signal of a contact to the object is provided to the CPU 11 from the touch input detection circuit 14a, and the object is recognized in the CPU. The sound processing circuit 15 generates an analog sound signal according to a sound production instruction from the CPU 11, and outputs it to a speaker 22. The communication control circuit 20 and the communication interface 21 are disposed in the communication portion 23, and are used for wirelessly connecting the game machine 1 to another game machine and the like. The communication control circuit 20 and the communication interface 21 are connected to the CPU 11 via the bus 16. The communication control circuit 20 and the communication interface 21 control a connection signal for connecting the game machine 1 to the internet via local wireless network or wireless LAN, and transmit the connection signal, according to a command from the CPU 11.

An exterior memory device 17 that is a separate body from the control device 10 is connected to the bus 16. For example, on the exterior memory device 17, there is a game cartridge and the like that is detachably mounted to the main body 2, for example on the lower chassis 2b. In the interior of the exterior memory device 17, a ROM 18 as a memory media, and a memory 19 as a memory for a user that is rewritable are arranged. On the ROM 18, a game program for making the game machine 1 function as a computer, and various data necessary for executing the game program are recorded in advance. In the various data, various image data and the like are included. In the memory 19, for example, a memory that is rewritable like a flash memory is used. In this memory 19, for example, save data and the like of games are recorded when necessary. In addition, for the memory media of the exterior memory device 17, not limiting to a semiconductor memory element, but various memory medium, such as a magnetic memory media, an optical memory media, a magneto-optical memory media, and the like may be used. In addition, an interface circuit mediates between the bus 16 and each element when necessary, but illustrations thereof are omitted here.

In the game machine 1 of the above kind of configuration, by loading the game program recorded in the ROM 18 of the exterior memory device 17 and executing the loaded program in CPU 11, a player can play games of various categories on the liquid crystal monitor 3. In addition, by connecting the game machine 1 to the wireless network via the communication control circuit 20, connecting to another game machine via a communication cable and the like, it is possible to exchange data with other game machines and play games competing with other game machines.

[Summary of Various Processes in the Game Device]

Figure 3:
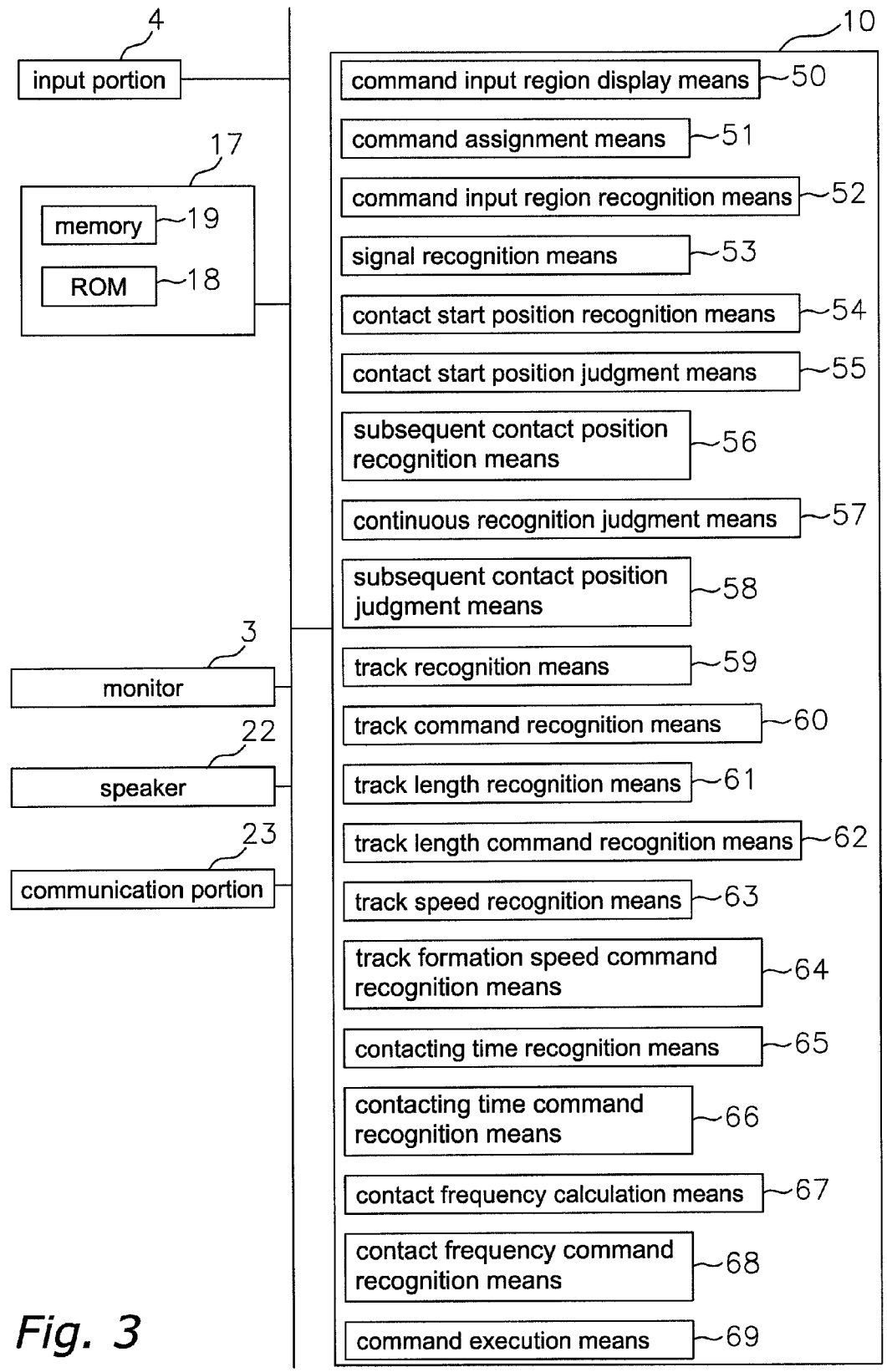
FIG. 3 is a block diagram showing the functions of the portable game machine.

The game executed in this game machine, for example, is a baseball game. This game machine is able to execute a command inputted from the touch panel type of monitor 3b on a computer having the touch panel type of monitor 3b. FIG. 3 is a function block diagram for describing a function playing a major role in the present invention.

A command input region display means 50 has a function that displays a command icon (command input region) for inputting a command on the touch panel type of monitor 3b. In the command input region display means 50, the command icon for inputting a command is displayed on the touch panel type of monitor 3b.

In this means, a coordinate data that shows the image data and the display position of this image data corresponding to the command icon is recognized in the CPU 11. Then, a command for displaying this image data on the touch panel type of monitor 3b is issued from the CPU 11. Then, using the image data for the command icon, the command icon is displayed on the touch panel type of monitor 3b on the position shown by the coordinate data for the command icon. In addition, when loading a game program, the image data for the command icon is loaded from the exterior memory device 17, for example ROM 18, to RAM 13, and stored in RAM 13.

A command assignment means 51 has a function that makes a process of assigning a plurality of commands to the command icon execute in the CPU 11. In the command assignment means 51, the process of assigning a plurality of commands to the command icon is executed by the CPU 11.

In this means, the process of assigning a plurality of commands to the image data for the command icon is executed by the CPU 11. The corresponding relationship between the image data for the command icon and the plurality of commands when assigning the plurality of commands to the image data for the command icon is specified in advance in the game program loaded in the RAM 13. The data that shows this corresponding relationship, for example a first corresponding table, is stored in the RAM 13, and this first corresponding table is recognized in the CPU 11.

A command input region recognition means 52 has a function that enables the region area of the command icon displayed on the touch panel type of monitor 3b to be recognized in the CPU 11. In the command input region recognition means 52, the region area of the command icon displayed on the touch panel type of monitor 3b is recognized in the CPU 11.

In this means, the region area of the command icon displayed on the touch panel type of monitor 3b, for example the coordinate data inside the command icon is recognized in the CPU 11.

A signal recognition means 53 has a function that enables a contact signal from the touch panel type of monitor 3b to be recognized in the CPU 11, when an instruction means, for example a touch pen, contacts the touch panel type of monitor 3b. In the signal recognition means 53, when the touch pen contacts the touch panel type of monitor 3b, the contact signal from the touch panel type of monitor 3b is recognized in the CPU 11.

In this means, when a touch pen contacts the touch panel type of monitor 3b, the contact signal is sent out from the touch panel type of monitor 3b, and this contact signal is recognized in the CPU 11. For example, in this means, when a touch pen directly contacts the touch panel type of monitor 3b, the contact signal showing the contact position of the touch pen is sent out from the touch panel type of monitor 3b. Then, this contact signal is recognized in the CPU 11.

A contact start position recognition means 54 has a function that enables the coordinate data of the contact start position on the touch panel type of monitor 3b corresponding to the contact start signal sent out from the touch panel type of monitor 3b at the time a touch pen started contacting the touch panel type of monitor 3b to be recognized in CPU 11. In the contact start position recognition means 54, at the time the touch pen started contacting the touch panel type of monitor 3b, the coordinate data of the contact start position on the touch panel type of monitor 3b corresponding to the contact start signal sent out from the touch panel type of monitor 3b is recognized in the CPU 11.

In this means, at the time the touch pen started contacting the touch panel type of monitor 3b, the coordinate data of the contact start position showing the starting position of the contact of the contact pen corresponding to the contact start signal sent out from the touch panel type of monitor 3b is recognized in the CPU 11.

A contact start position judgment means 55 has a function that enables the judging of whether the coordinate data of the contact start position on the touch panel type of monitor 3b matches the coordinate data inside the command icon be made in the CPU 11. In the contact start position judgment means 55, whether the coordinate data of the contact start position on the touch panel type of monitor 3*b* matches the coordinate data inside the command icon is judged by the CPU 11.

In this means, whether the coordinate data of the contact start position on the touch panel type of monitor 3*b* matches the coordinate data inside the command icon that is recognized in the CPU 11 in the command input region recognition means is judged by the CPU 11. More specifically, whether or not the contact start position of the touch pen is positioned inside the region area of the command icon displayed on the touch panel type of monitor 3*b* is judged by the CPU 11.

A subsequent contact position recognition means 56 has a function that enables the coordinate data of a subsequent contact position on the touch panel type of monitor 3*b* corresponding to a subsequent contact signal sent from the touch panel type of monitor 3*b* following the contact start signal be recognized in the CPU 11, in the case that the CPU 11 judged that the coordinate data of the contact start position matches the coordinate data inside the command icon. In the subsequent contact position recognition means 56, when the CPU 11 judged that the coordinate data of the contact start position matches the coordinate data inside the command icon, the coordinate data of a subsequent contact position on the touch panel type of monitor 3*b* corresponding to a subsequent contact signal sent from the touch panel type of monitor 3*b* following the contact start signal is recognized in the CPU 11.

In this means, in the case that the CPU 11 judged that coordinate data of the contact start position of the touch pen matches the coordinate data inside the command icon, the coordinate data of the subsequent contact position showing the position on which the touch pen touched, corresponding to the subsequent contact signal sent from the touch panel type of monitor 3*b* following the contact start signal, is recognized in the CPU 11.

A continuous recognition judgment means 57 has a function that makes the CPU 11 judge whether or not the subsequent contact position on the touch panel type of monitor 3*b* is recognized in the CPU 11 to be discontinuous. In the continuous recognition judgment means 57, whether or not the subsequent contact position on the touch panel type of monitor 3*b* is recognized in the CPU 11 to be discontinuous is judged by the CPU 11.

In this means, whether or not the subsequent contact position of the touch pen is recognized in the CPU 11 to be discontinuous is judged by the CPU 11. For example, in this means, whether or not the subsequent contact position of the touch pen is recognized in the CPU 11 outside the range of a predetermined time interval is judged by the CPU 11.

A subsequent contact position judgment means 58 has a function that makes the CPU 11 judge whether or not the coordinate data of the subsequent contact position matches the coordinate data of the contact start position. In the subsequent contact position judgment means 58, whether or not the coordinate data of the subsequent contact position matches the coordinate data of the contact start position is judged by the CPU 11.

In this means, whether or not the coordinate data of the subsequent contact position of the touch pen matches the coordinate data of the contact start position of the touch pen is judged by the CPU 11. For example, whether or not the X coordinate data of the subsequent contact position of the touch pen is identical to the X coordinate data of the contact start position of the touch pen is judged by the CPU 11. In addition, whether or not the Y coordinate data of the subsequent contact position of the touch pen is identical to the Y coordinate data of the contact start position of the touch pen is judged by the CPU 11.

A track recognition means 59 has a function that makes the CPU 11 recognize the track specified by the contact start position and the subsequent contact position of the touch pen, based on the coordinate data of the contact start position and the coordinate data of the subsequent contact position, in the case that the CPU 11 judged that the coordinate data of the subsequent contact position does not match the coordinate data of the contact start position. In the track recognition means 59, when the CPU 11 judged that the coordinate data of the subsequent contact position does not match the coordinate data of the contact start position, based on the coordinate data of the contact start position and the coordinate data of the subsequent contact position, the specified track is recognized in the CPU 11 according to the contact start position and the subsequent contact position of the touch pen.

In this means, when the CPU 11 judged that the coordinate data of the subsequent contact position does not match the coordinate data of the contact start position of the touch pen, based on the coordinate data of the contact start position of the touch pen and the coordinate data of the subsequent contact position of the touch pen, a track data corresponding to the specified track according to the contact start position and the subsequent contact position of the touch pen is recognized in the CPU 11.

A track command recognition means 60 has a function that makes the CPU 11 recognize one command out of any of a plurality of commands, based on the track. In the track command recognition means 60, a function that makes the CPU 11 recognize one command out of any of a plurality of commands, based on the track.

In this means, based on the track data recognized in the CPU 11, one command out of any of the plurality of commands, corresponding to this track data, is recognized in the CPU 11. Here, the corresponding relationship between the track data and the command is specified in advance in the game program loaded in the RAM 13. A data, for example a second corresponding table, showing this corresponding relationship is stored in the RAM 13, and this second corresponding table is recognized in the CPU 11. Then, based on this second corresponding table, the command corresponding to the track data is recognized in the CPU 11.

A track length recognition means 61 has a function that makes the CPU 11 recognize the length of the track specified by the contact start position and the subsequent contact position of the touch pen, based on the coordinate data of the contact start position and the coordinate data of the subsequent contact position, in the case that the CPU 11 judged that the coordinate data of the subsequent contact position does not match the coordinate data of the contact start position. In the track length recognition means 61, when the CPU 11 judged that the coordinate data of the subsequent contact position does not match the coordinate data of the contact start position, based on the coordinate data of the contact start position and the coordinate data of the subsequent contact position, the length of the track specified by the contact start position and the subsequent contact position of the touch pen is recognized in the CPU 11.

In this means, in the case that the CPU 11 judged that the coordinate data of the subsequent contact position of the touch pen does not match the coordinate data of the contact start position of the touch pen, based on the coordinate data of the contact start position of the touch pen and the coordinate data of the subsequent contact position of the touch pen, a process of calculating the length of the track from the contact start position of the touch pen to the final contact position of the touch pen is executed by the CPU 11. Then, the track length data showing the length of this track is recognized in the CPU 11. In addition, here, when the CPU 11 continuously recognized the subsequent contact position of the touch pen within the range of the predetermined time interval, in the case that the CPU 11 recognized a subsequent contact position of the touch pen outside the range of the predetermined time interval, the last subsequent contact position of the touch pen recognized in the CPU 11 is recognized in the CPU 11 as the final contact position of the touch pen.

A track length command recognition means 62 has a function that makes the CPU 11 recognize one command out of any of a plurality of commands, based on the length of the track. In the track length command recognition means 62, based on the length of the track, one command out of any of the plurality of commands is recognized in the CPU 11.

In this means, based on the track length data recognized in the CPU 11, one command out of any of a plurality of commands is recognized in the CPU 11. Here, the corresponding relationship between the track length data and the command is specified in advance in the game program loaded in the RAM 13. A data, for example a third corresponding table, showing this corresponding relationship is stored in the RAM 13, and this third corresponding table is recognized in the CPU 11. Then, based on this third corresponding table, the command corresponding to the track length table is recognized in the CPU 11.

A track speed recognition means 63 has a function that makes the CPU 11 recognize the formation speed of the track specified by the contact start position and the subsequent contact position of the touch pen, based on the coordinate data of the contact start position and the coordinate data of the subsequent contact position, in the case that the CPU 11 judged that the coordinate data of the subsequent contact position does not match the coordinate data of the contact start position. In the track speed recognition means 63, when the CPU 11 judged that the coordinate data of the subsequent contact position does not match the coordinate data of the contact start position, based on the coordinate data of the contact start position and the coordinate data of the subsequent contact position, the formation speed of the track specified by the contact start position and the subsequent contact position of the touch pen is recognized in the CPU 11.

In this means, in the case that the CPU 11 judged that the coordinate data of the subsequent contact position of the touch pen does not match the coordinate data of the contact start position of the touch pen, based on the coordinate data of the contact start position of the touch pen and the coordinate data of the subsequent contact position of the touch pen, the process of calculating the length of the track from the contact start position of the touch pen to the final contact position of the touch pen is executed by the CPU 11. Then, the track length data showing the length of this track is recognized in the CPU 11. In addition, the process of calculating the contacting time starting from the time the touch pen touched the touch panel type of monitor 3b to the time the touch pen separated from the touch panel type of monitor 3b is executed by the CPU 11. Then, a contacting time table showing this contacting time is recognized in the CPU 11. Then, by making the CPU 11 execute a process of dividing the track length data by the contacting time data, the formation speed of the track is calculated. Then, a formation speed data showing the formation speed of this track is recognized in the CPU 11.

In addition, here, when the CPU 11 continuously recognize the subsequent contact position of the touch pen within the range of a predetermined time interval, in the case that the CPU 11 recognized a subsequent contact position of the touch pen outside the range of the predetermined time interval, the time data of the time of the subsequent contact position of the touch pen last recognized in the CPU 11 is recognized in the CPU 11 as the time data of the time the touch pen separated from the touch panel type of monitor 3b.

A track formation speed command recognition means 64 has a function that makes the CPU 11 recognize one command out of any of a plurality of commands, based on the formation speed of the track. In the track formation speed command recognition means 64, based on the formation speed of the track, one command out of any of the plurality of commands is recognized in the CPU 11.

In this means, based on the formation speed data of the track, one command out of any of a plurality of commands is recognized in the CPU 11. Here, the corresponding relationship between the formation speed data of the track and the command is specified in advance in the game program loaded in the RAM 13. A data, for example a fourth corresponding table, showing this corresponding relationship is stored in the RAM 13, and this fourth corresponding table is recognized in the CPU 11. Then, based on this fourth corresponding table, the command corresponding to the formation speed data of the track is recognized in the CPU 11.

A contacting time recognition means 65 has a function that makes the CPU 11 recognize the contacting time of the touch pen on the touch panel type of monitor 3b, in the case that the CPU 11 judged that the coordinate data of the subsequent contact position matches the coordinate data of the contact start position. In the contacting time recognition means 65, in the case that the CPU 11 judged that the coordinate data of the subsequent contact position matches the coordinate data of the contact start position, the contacting time of the touch pen on the touch panel type of monitor 3b is recognized in the CPU 11.

In this means, in the case that the CPU 11 judged that the coordinate data of the subsequent contact position of the touch pen matches the coordinate data of the contact start position of the touch pen, a process of calculating the contacting time starting from the time the touch pen touched the touch panel type of monitor 3b to the time the touch pen separated from the touch panel type of monitor 3b is executed by the CPU 11. Then, a contacting time data showing this contacting time is recognized in the CPU 11. Here, when the CPU 11 continuously recognizes the subsequent contact position of the touch pen within the range of a predetermined time interval, when the CPU 11 recognized the subsequent contact position of the touch pen outside the range of the predetermined time interval, the time data of the time the CPU 11 last recognized the subsequent contact position of the touch pen is recognized in the CPU 11 as the time data of the time the touch pen separated from the touch panel type of monitor 3b.

A contacting time command recognition means 66 has a function that makes the CPU 11 recognize one command out of any of a plurality of commands, based on the contacting time. In the contacting time command recognition means 66, a function that makes the CPU 11 recognize one command out of any of a plurality of commands, based on the contacting time.

In this means, based on the contacting time data, one command out of any of a plurality of commands is recognized in the CPU 11. Here, the corresponding relationship between the contacting time data and the command is specified in advance in the game program loaded in the RAM 13. A data, for example a fifth corresponding table, showing this corresponding relationship is stored in the RAM 13, and this fifth corresponding table is recognized in the CPU 11. Then, based on this fifth corresponding table, the command corresponding to the contacting time data is recognized in the CPU 11.

A contact frequency calculation means 67 has a function that makes the CPU 11 execute a process of calculating the number of times the contact start position and the subsequent contact position are recognized in the CPU 11, in the case that the CPU 11 judged that the subsequent contact position is intermittently recognized in the CPU 11 on the touch panel type of monitor 3b. In the contact frequency calculation means 67, when the CPU 11 judged that the subsequent contact position is intermittently recognized in the CPU 11 on the touch panel type of monitor 3b, a process of calculating the number of times the contact start position and the subsequent contact position are recognized in the CPU 11 is executed by the CPU 11.

In this means, when the CPU 11 judged that the subsequent contact position of the touch pen is continuously recognized outside the range of a predetermined time interval, a process of calculating the contact frequency of the touch pen on the touch panel type of monitor 3b is executed by the CPU 11. For example, when the CPU 11 judged that the subsequent contact position of the touch pen is continuously recognized outside the range of a predetermined time interval, a process of calculating the number of times the contact start position and the subsequent contact position recognized in the CPU 11 is executed by the CPU 11. Then, this frequency is recognized in the CPU 11 as the contact frequency data.

A contact frequency command recognition means 68 has a function that makes the CPU 11 recognize one command out of any of a plurality of commands, based on the contact frequency. In the contact frequency command recognition means 68, based on the contact frequency, one command out of any of a plurality of commands is recognized in the CPU 11.

In this means, based on the contact frequency data, one command out of any of a plurality of commands is recognized in the CPU 11. Here, the corresponding relationship between the contact frequency data and the command is specified in advance in the game program loaded in the RAM 13. A data, for example a sixth corresponding table, showing this corresponding relationship is stored in the RAM 13, and this sixth corresponding table is recognized in the CPU 11. Then, based on this sixth corresponding table, the command corresponding to the contact frequency data is recognized in the CPU 11.

A command execution means 69 has a function that makes the CPU 11 execute a process for executing one command out of any of a plurality of commands. In the command execution means 69, a process for executing one command out of any of the plurality of commands is executed by the CPU 11.

In this means, when one command out of any of a plurality of commands assigned to the command icon is recognized in the CPU 11, the process for executing this command is executed by the CPU 11. For example, when the CPU 11 recognized a command for operating the player character, a process for displaying on at least one of either the non-touch panel type of monitor 3a or the touch panel type of monitor 3b the state of the player character executing a movement corresponding to this command is executed by the CPU 11. Then, the moving state of the player character, using the player character image data, is displayed on at least one of the monitors of either the non-touch panel type of monitor 3a or the touch panel type of monitor 3b.

[The Process Flow and Description of a Command Instruction System in a Baseball Game]

Next, an embodiment of the command instruction system in a baseball game will be described. In addition, the flow regarding the command instruction system shown in FIGS. 12 to 15 is also described at the same time.

First, when the game machine is powered on and the game machine is activated, a baseball game program is loaded from the recording media 17 and stored in the RAM 12. During this time, various basic game data necessary for executing a baseball game are loaded from the recording media 17 and stored in the RAM 12.

For example, a three dimensional game space image data are stored in the basic game data, and the three dimensional game space image data, for example a background image data and the like, stored in the RAM 12, is recognized in the CPU 11. In addition, a position coordinate data for arranging the three dimensional game space image data in the three dimensional game space is are stored in the basic game data, and this position coordinate data is recognized in the CPU 11.

In addition, a character image data are stored in the basic game data, and the character image data, for example a player character image data, a ball image data, an icon image data and the like, stored in the RAM 12, is recognized in the CPU 11. In addition, a position coordinate data for arranging a character image data in the three dimensional game space are stored in the basic game data, and this position coordinate data is recognized in the CPU 11.

Figure 4:
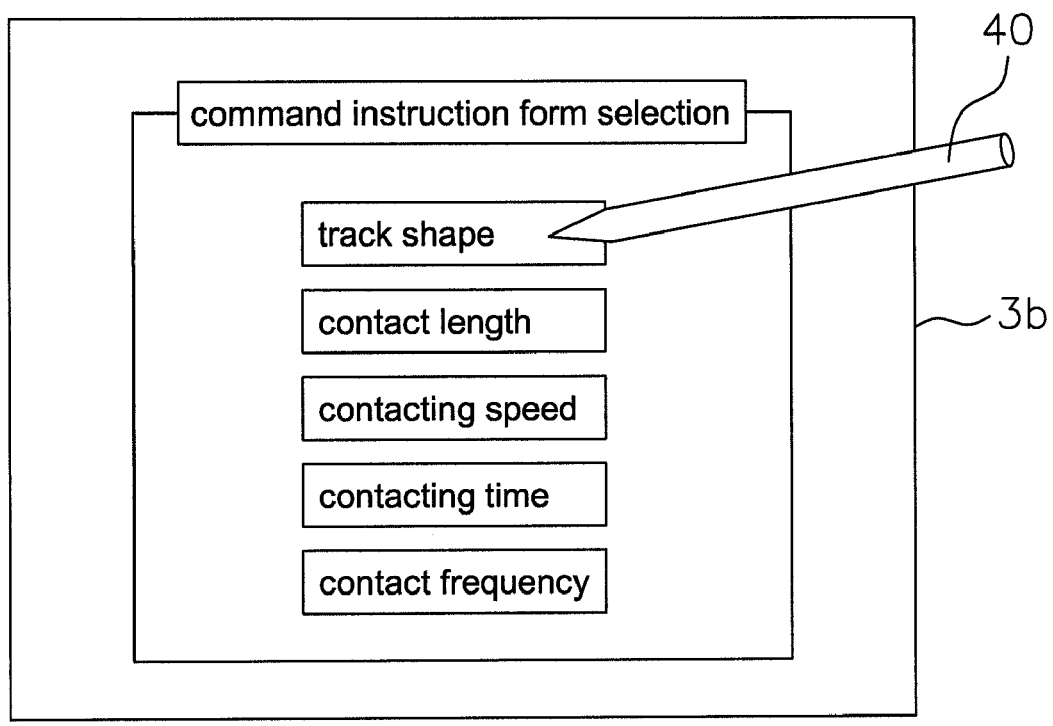
FIG. 4 shows a select screen of the command instruction forms.

Next, the baseball game program stored in the RAM 12 is executed by the CPU 11 (S1). Then, a select screen for making a selection of the command instruction form in the baseball game is shown on the touch panel type of monitor 3b (S2), as shown in FIG. 4. On this select screen, as an item that shows a command instruction form, for example, "track shape" item, "contact length" item, "contacting speed" item, "contacting time" item, and "contact frequency" item are displayed. When one item out of any of these plurality of items is selected by the touch pen 40 (S3: S31, S32, S33, S34, S35), various commands are instructed in the command instruction form corresponding to the selected item.

Figure 5:
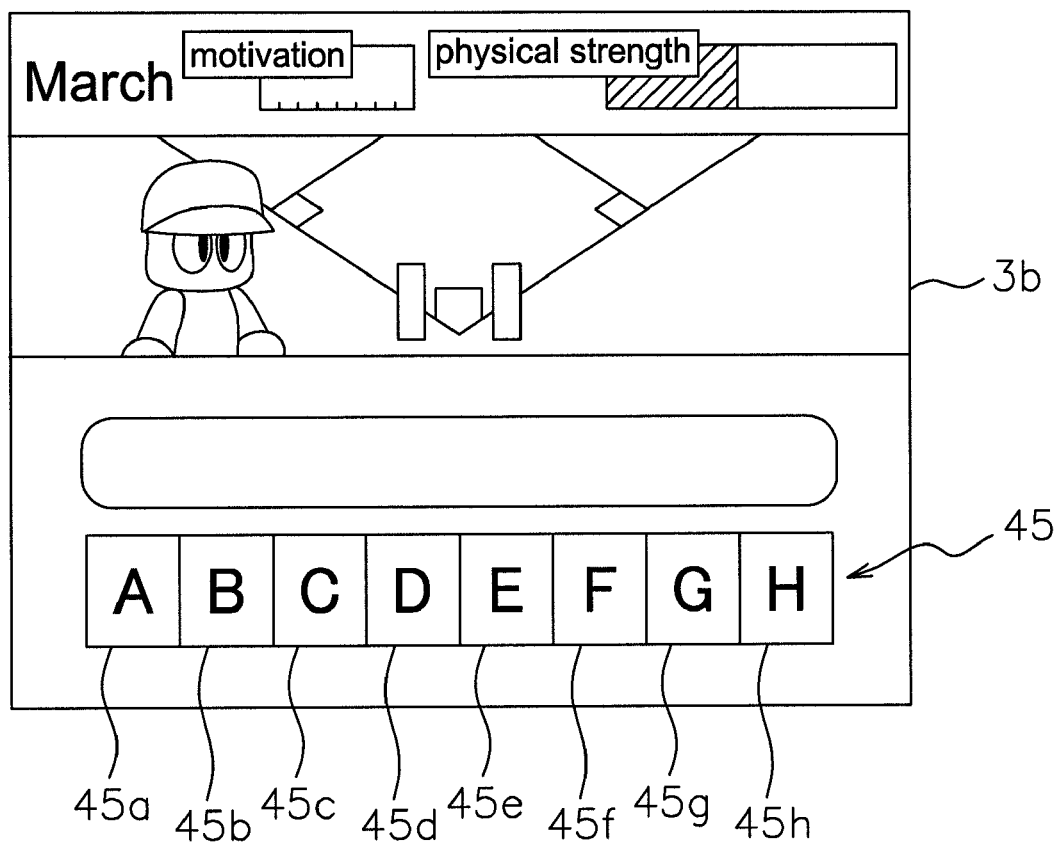
FIG. 5 shows a training screen in a baseball game.

Next, for example, a command (a raising start command) in order to start raising a player in a baseball game is sent out from the CPU 11. Then, by using a background image data and a character image data that are recognized in the CPU 11, the background image, player character, and a plurality of command icons 45, as shown in FIG. 5, are displayed on the touch panel type of monitor 3b (S4). Here, the size of each command icon displayed on the touch panel type of monitor 3b is set to be "1.0 cm in length×1.0 cm in width". In addition, the number of dots inside this command icon is set to be 32 dots.

Then, a process of assigning a plurality of commands to each command icon image data is executed by the CPU 11 (S5). The assigning of the plurality of commands to each command icon image data is realized by having the first corresponding table be recognized in the CPU 11 as shown in FIG. 6. For example, when one icon out of any of the plurality of command icons 45 displayed on the touch panel type of monitor 3b is selected by the touch pen 40, the CPU 11 refers to this first corresponding table, and a plurality of commands corresponding to the selected command icon is recognized in the CPU 11. In addition, when the command icon is displayed on the touch panel type of monitor 3b, the coordinate data inside the command icon 45 displayed on the touch panel type of monitor 3b is recognized in the CPU 11 (S6).

Below, the command instruction system in the case that the "track shape" item in Step 3 is selected (in the case of Yes in Step 31) will be described.

When the "track shape" item is selected, for example, when a player touches the touch panel type of monitor 3b with the touch pen 40, the coordinate data of the contact start position SS on the touch panel type of monitor 3b corresponding to a contact signal sent out from the touch panel type of monitor 3b is recognized in the CPU 11 (S7).

Next, whether or not the coordinate data of the contact start position SS on the touch panel type of monitor 3b matches the coordinate data inside one of the icons out of any of the plurality of command icons 45 is judged by the CPU 11 (S8). For example, when a player positioned the touch pen 40 inside the display region of the command icon 45a, whether or not the X coordinate data of the contact start position SS on the touch panel type of monitor 3b is identical to an X component of a coordinate data inside the command icon 45a is judged by the CPU 11. Then, whether or not the Y coordinate data of the contact start position SS on the touch panel type of monitor 3b is identical to a Y component of a coordinate data inside the command icon 45a is judged by the CPU 11.

Then, when the CPU 11 judged that the coordinate data of the contact start position SS of the touch pen 40 matches a coordinate data inside one of the icons out of any of the plurality of the command icons 45 (Yes in S8), the coordinate data of the subsequent contact position that shows the position touched by the touch pen 40 corresponding to the subsequent contact signal sent out from the touch panel type of monitor 3b following the contact start signal is recognized in the CPU 11 (S9). For example, when the CPU 11 judged that the X coordinate data of the contact start position SS on the touch panel type of monitor 3b is identical to one X coordinate data of any of the plurality of X coordinate data inside the command icon 45a, and that the CPU 11 judged that the Y coordinate data of the contact start position SS on the touch panel type of monitor 3b is identical to one Y coordinate data of any of the plurality of Y coordinate data inside the command icon 45a, the X coordinate data and the Y coordinate data of the subsequent contact position corresponding to the subsequent contact signal is recognized in the CPU 11.

Here, when the touch pen 40 touches the touch panel type of monitor 3b, a contact signal is sent out from the touch panel type of monitor 3b in every 1/60 (sec). Therefore, if the time TSo that the contact start signal is recognized in the CPU 11 is 0 (sec), the time TS that the subsequent contact signal recognized in the CPU 11 following the contact start signal is 1/60 (sec). In other words, at the time TS, which is 1/60 (sec) after the time point TSo that the position coordinate data of the contact start position SS is recognized in the CPU 11, the coordinate data of the subsequent contact position of the touch pen 40 is recognized in the CPU 11.

In addition, the name subsequent contact signal used here is a term that refers to a signal of either a contact signal at the time after 1/60 (sec) is passed from the time To the contact start signal is sent from the touch panel type of monitor 3b, or a contact signal at the time after n/60 (sec) is passed from the time To the contact start signal is sent from the touch panel type of monitor 3b. In addition, "n" shown here is a natural number. Here, the subsequent contact signal is a contact signal at the time after 1/60 (sec) is passed from the time To the contact start signal is sent from the touch panel type of monitor 3b.

Figure 7:
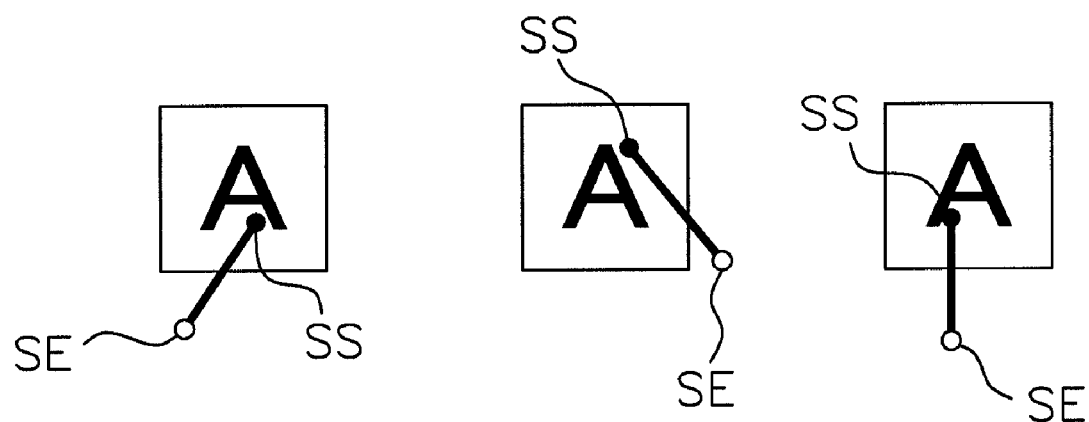
FIG. 7 shows the corresponding relationships between the track data and the commands.

In addition, when the CPU 11 judged that the coordinate data of the contact start position SS of the touch pen 40 matches the coordinate data inside one of the icons of any of the plurality of command icons 45 (Yes in S8), the second corresponding table that shows the corresponding relationship between the track data and the command is recognized in the CPU 11 (S10a). In addition, this second corresponding table is prepared for each of the command icons 45a, 45b, 45c, 45d, 45e, 45f, 45g, and 45h. In FIG. 7, as an example of the second corresponding table, the second corresponding table in the case that the CPU 11 judged that the coordinate data of the contact start position SS of the touch pen 40 matches a coordinate data inside the command icon 45a is shown.

Next, whether or not the coordinate data of the subsequent contact position of the touch pen 40 matches the coordinate data of the contact start position SS of the touch pen 40 is judged by the CPU 11 (S11). For example, whether or not the X coordinate data of the subsequent contact position of the touch pen 40 is identical to the X coordinate data of the contact start position SS of the touch pen 40 is judged by the CPU 11. In addition, whether or not the Y coordinate data of the subsequent contact position of the touch pen 40 is identical to the Y coordinate data of the contact start position SS of the touch pen 40 is judged by the CPU 11.

Then, when the CPU 11 judged that the coordinate data of the subsequent contact position of the touch pen 40 does not match the coordinate data of the contact start position SS (No in S11), based on the coordinate data of the contact start position SS of the touch pen 40 and the coordinate data of the subsequent contact position of the touch pen 40, the track data corresponding to the track specified by the contact start position SS and the subsequent contact position of the touch pen 40 is recognized in the CPU 11 (S12a). Then, based on the track data recognized in the CPU 11, one of the commands out of any of a plurality of commands, corresponding to this track data, is recognized in the CPU 11. Here, the command corresponding to the track data out of the plurality of commands, based on the second corresponding table, is recognized in the CPU 11 (S13).

More specifically, for example, after a player first touched the inside of the command icon 45a with the touch pen 40, when the touch pen moved on the touch panel type of monitor 3b, based on the coordinate data (xo, yo) of the contact start position SS of the touch pen 40 and a plurality of the coordinate data (xn, yn) of the subsequent contact position of the touch pen, the track formed by connecting each of the contact positions of the touch pen 40 together is recognized in the CPU 11 as the track image data (track data). Then, one of the commands out of any of the plurality of commands, corresponding to this track image data, based on the second corresponding table shown in FIG. 7, is recognized in the CPU 11.

By doing so, when one of the commands out of any of the plurality of commands assigned to the command icon is recognized in the CPU 11 (S13), this command is sent out from the CPU 11. Then, an image showing the state corresponding to this command is displayed on at least one of the monitors of either the non-touch panel type of monitor 3a or the touch panel type of monitor 3b (S14). For example, when the CPU 11 sent out a command that makes the player character move, a movement image data of the player character is recognized by the CPU 11. Then, using this image data, the moving state of the player character is displayed on at least one of the monitors of either the non-touch panel type of monitor 3a or the touch panel type of monitor 3b.

Below, the command instruction system in the case that "contact length" item is selected in Step 3 (in the case of Yes in Step 32) will be described. Here, parts of the same processes executed as described above will be given the same step numbers.

When "contact length" item is selected, for example, when the player touches the touch panel type of monitor 3b with the touch pen 40, the coordinate data of the contact start position SS on the touch panel type of monitor 3b corresponding to the contact signal sent from the touch panel type of monitor 3b is recognized in the CPU 11 (S7).

Next, whether or not the coordinate data of the contact start position SS on the touch panel type of monitor 3b matches the coordinate data inside one of the icons of any of the plurality of command icons 45 is judged by the CPU 11 (S8). For example, when the player positioned the touch pen 40 inside the display region of the command icon 45a, whether or not the X coordinate data of the contact start position SS on the touch panel type of monitor 3b is identical to an X component of the coordinate data inside the command icon 45a is judged by the CPU 11. Then, whether or not the Y coordinate data of the contact start position SS on the touch panel type of monitor 3b is identical to a Y component of the coordinate data inside the command icon 45a is judged by the CPU 11.

Then, when the CPU 11 judged that the coordinate data of the contact start position SS of the touch pen 40 matches the coordinate data inside one of the icons of any of the plurality of command icons 45 (Yes in S8), the coordinate data of the subsequent contact position showing the position touched by the touch pen 40 corresponding to the subsequent contact signal sent from the touch panel type of monitor 3b following the contact start signal is recognized in the CPU 11 (S9). For example, when the CPU 11 judged that the X coordinate data of the contact start position SS on the touch panel type of monitor 3b is identical to an X coordinate data of any of the plurality of X coordinate data inside the command icon 45a, and that the CPU 11 judged that the Y coordinate data of the contact start position SS on the touch panel type of monitor 3b is identical to a Y coordinate data of any of the plurality of Y coordinate data inside the command icon 45a, the X coordinate data and the Y coordinate data of the subsequent contact position corresponding to the subsequent contact signal are recognized in the CPU 11.

Here, when the touch pen 40 touches the touch panel type of monitor 3b, a contact signal is sent from the touch panel type of monitor 3b in every 1/60 (sec). Therefore, if the time TSo the contact start signal recognized in the CPU 11 is 0 (sec), the time TS that the next subsequent contact signal following the contact start signal recognized in the CPU 11 is 1/60 (sec). In other words, at the time TS after 1/60 (sec) is passed from the time TSo the position coordinate data of the contact start position SS is recognized in the CPU 11, the coordinate data of the subsequent contact position of the touch pen 40 is recognized in the CPU 11.

In addition, the name subsequent contact signal used here is a term referring to one of the signals of either the contact signal at the time after 1/60 (sec) is passed from the time To the contact start signal is sent from the touch panel type of monitor 3b, or the contact signal at the time after n/60 (sec) is passed from the time To the contact start signal is sent from the touch panel type of monitor 3b. In addition, n shown here is a natural number. Here, the subsequent contact signal is the contact signal at the time after 1/60 (sec) is passed from the time To the contact start signal is sent from the touch panel type of monitor 3b.

Figures 8, 9:
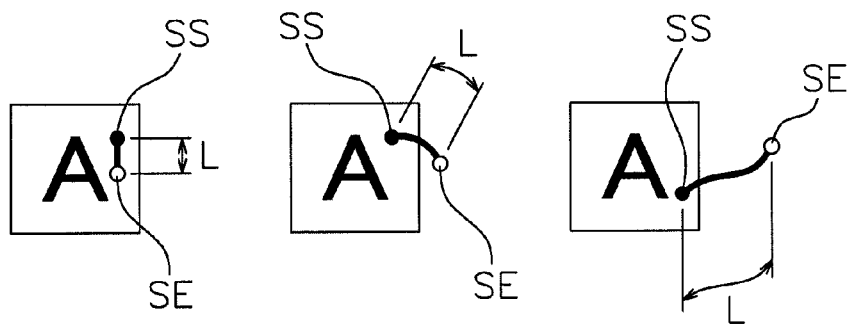
FIG. 8 shows the corresponding relationships between the track length data and the commands.
FIG. 9 shows the corresponding relationships between the track formation speed data and the commands.
Figure 12:
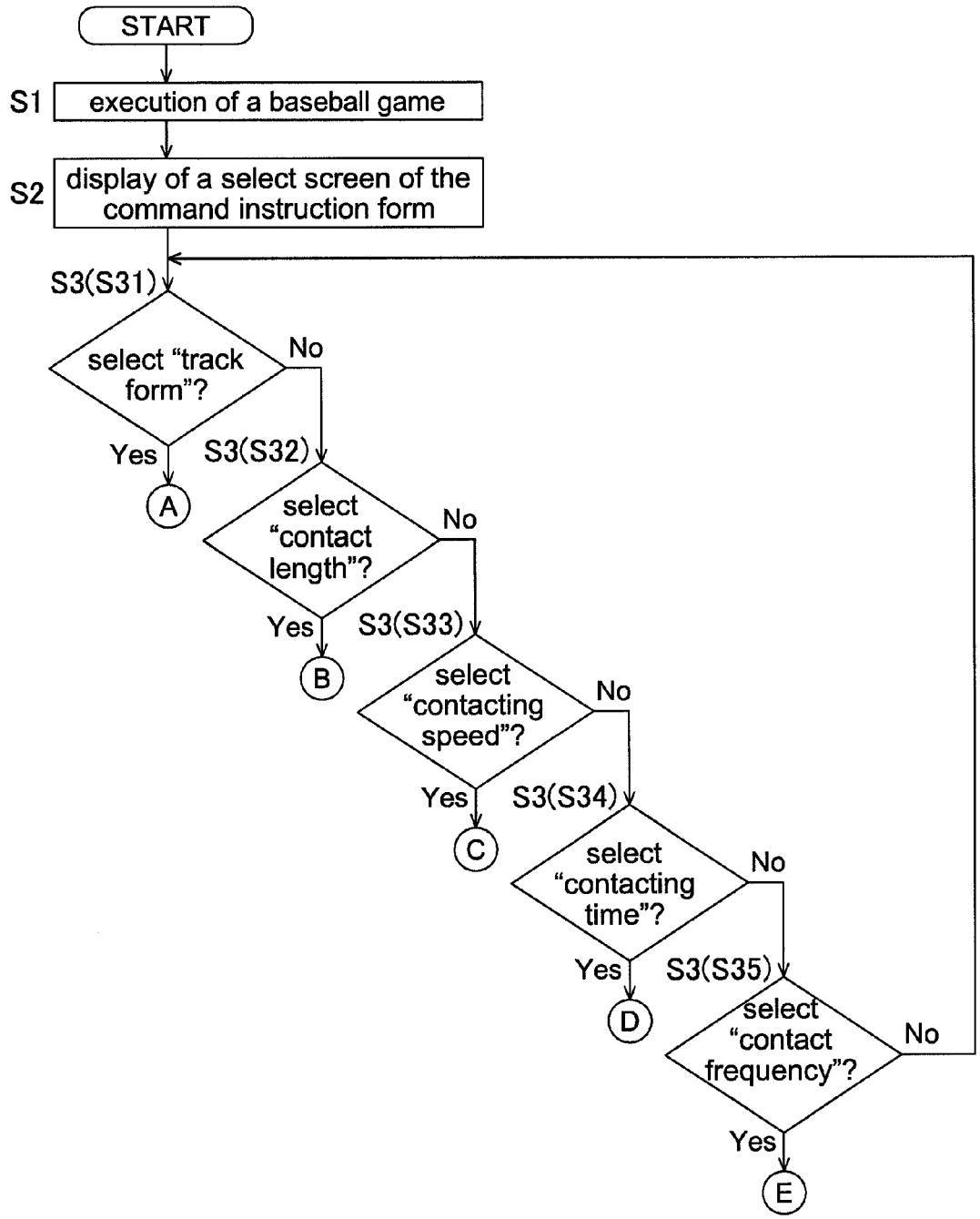
FIG. 12 is a figure (1) used for describing the flow regarding the command instruction system.
Figure 13:
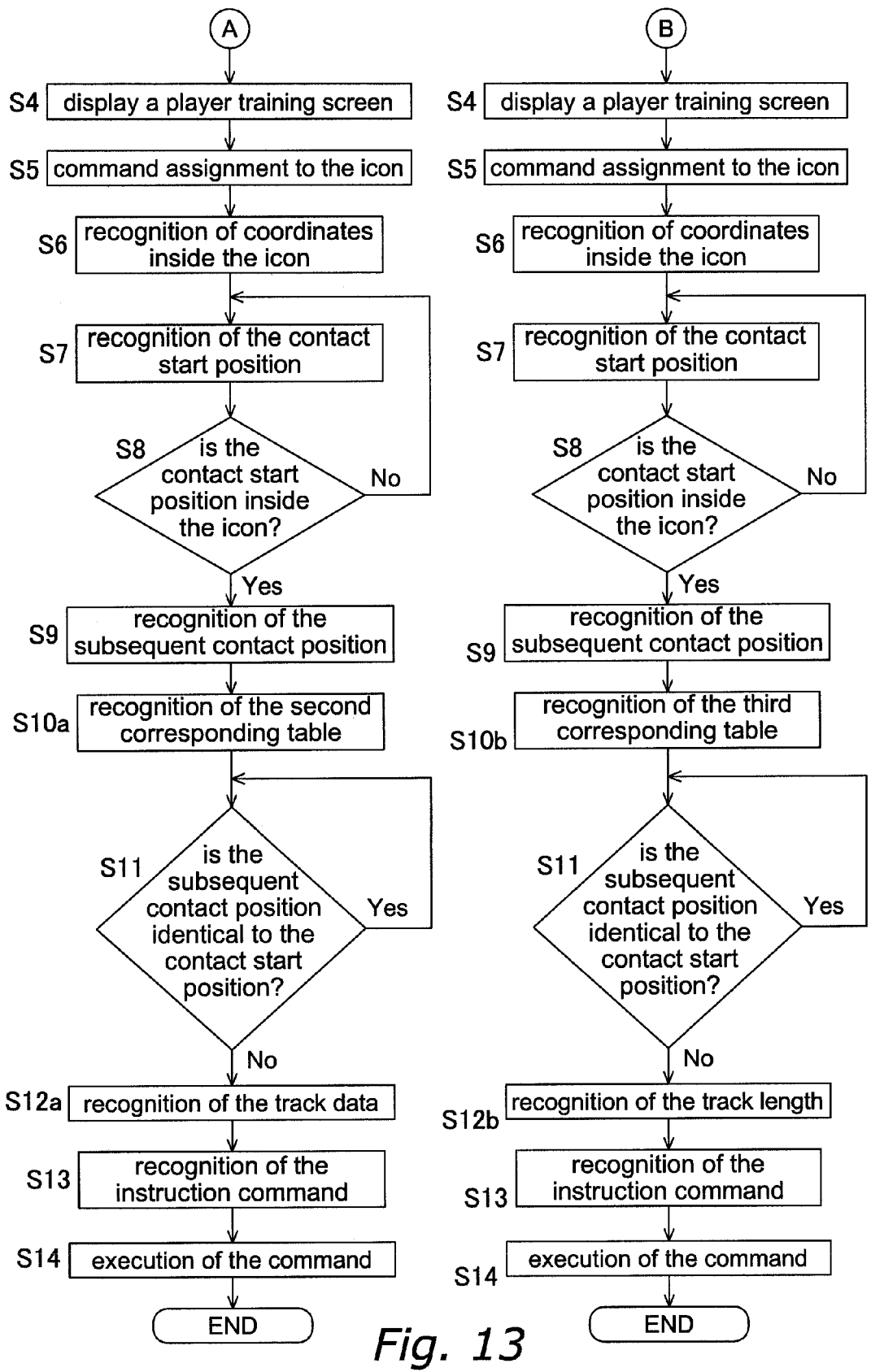
FIG. 13 is a figure (2) used for describing the flow regarding the command instruction system.
Figure 14:
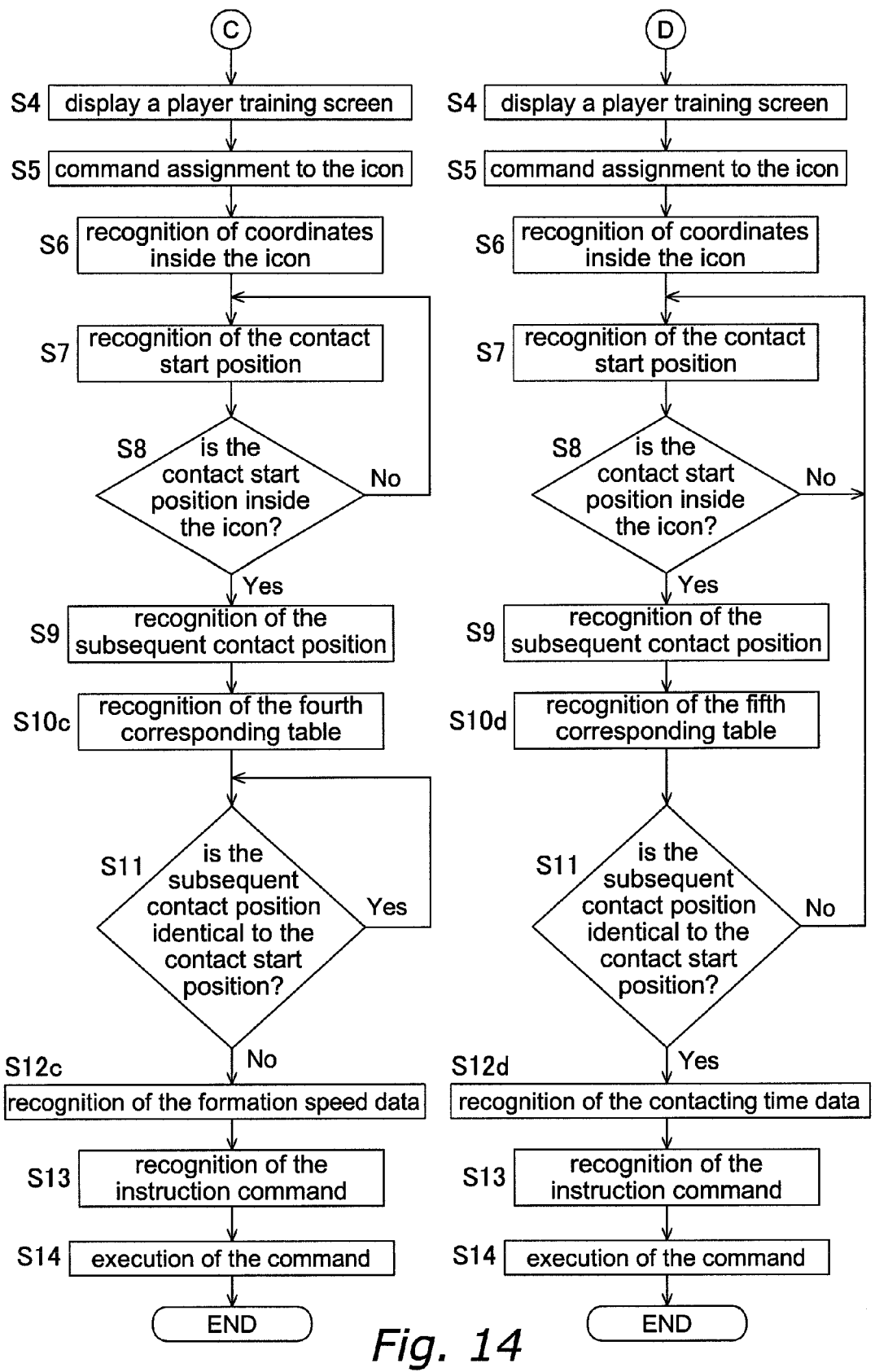
FIG. 14 is a figure (3) used for describing the flow regarding the command instruction system.
Figure 15:
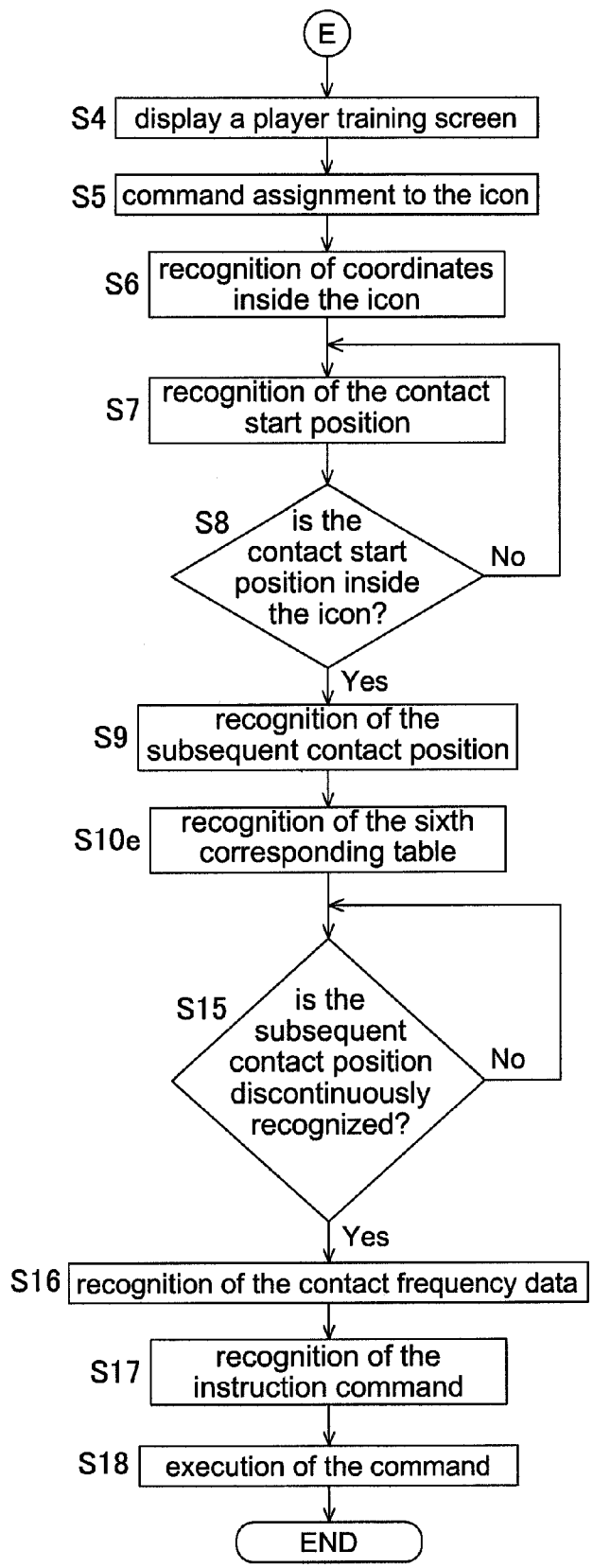
FIG. 15 is a figure (4) used for describing the flow regarding the command instruction system.

In addition, when the CPU 11 judged that the coordinate data of the contact start position SS of the touch pen 40 matches the coordinate data inside the command icons 45 (Yes in S8), the third corresponding table showing the corresponding relationship between the track length data L and the command is recognized in the CPU 11 (S10b). In addition, this third corresponding table is prepared for each of the command icons 45a, 45b, 45c, 45d, 45e, 45f, 45g, and 45h. In FIG. 8, as an example of the third corresponding table, a third corresponding table in the case that the CPU 11 judged that the coordinate data of the contact start position SS of the touch pen 40 matches the coordinate data inside the command icon 45a is shown.

Next, whether or not the coordinate data of the subsequent contact position of the touch pen 40 matches the coordinate data of the contact start position SS of the touch pen 40 is judged by the CPU 11 (S11). For example, whether or not the X coordinate data of the subsequent contact position of the touch pen 40 is identical to the X coordinate data of the contact start position SS of the touch pen 40 is judged by the CPU 11. In addition, whether or not the Y coordinate data of the subsequent contact position of the touch pen 40 is identical to the Y coordinate data of the contact start position SS of the touch pen 40 is judged by the CPU 11.

Then, when the CPU 11 judged that the coordinate data of the subsequent contact position does not match the coordinate data of the contact start position SS of the touch pen 40 (No in S11), based on the coordinate data of the contact start position SS of the touch pen 40 and the coordinate data of the subsequent contact position of the touch pen 40, a process of calculating the length of the track from the contact start position SS of the touch pen 40 to the final contact position SE of the touch pen 40 is executed by the CPU 11. Then, the track length data L showing the length of this track is recognized in the CPU 11 (S12b). Then, based on the track length data L recognized in the CPU 11, one command out of any of the plurality of commands, corresponding to this track length data L, is recognized in the CPU 11. Here, the command corresponding to the track length data L out of the plurality of commands is recognized in the CPU 11 (S13), based on the third corresponding table shown in FIG. 8.

More specifically, after a player first touched the inside of one of the icons of any of the plurality of command icons 45 with the touch pen 40, in the case that the touch pen 40 moved on the touch panel type of monitor 3b, based on the coordinate data (xo, yo) of the contact start position SS of the touch pen 40 and a plurality of coordinate data (xn, yn) of the subsequent contact position of the touch pen 40, a process ($dLo=\sqrt{((x(1)-xo)^2+(y(1)-yo)^2}$, $dL(n)=\sqrt{((x(n)-x(n-1))^2+(y(n)-y(n-1))^2)}$, where n is a natural number that is equal to or greater than 2) of calculating intervals of the contact positions of the touch pen 40 is executed by the CPU 11. Then, a process ($L=dLo+\Sigma dL(n)$: n=1 to n_max) of adding all intervals is executed by the CPU 11. By doing so, the track length data L showing the length of the track is calculated, and this track length data L is recognized in the CPU 11. Then, based on the track length data L recognized in the CPU 11, one command out of any of the plurality of commands, corresponding to this track length data L, is recognized in the CPU 11. Here, the command corresponding to the track length data L out of the plurality of commands is recognized in the CPU 11, based on the third corresponding table.

For example, based on the track length data L recognized in the CPU 11, the range that this track length data L belongs to is recognized by the CPU 11. For example, first, when the unit of the track length data L is in "cm", whether or not the track length data L is equal to or greater than 0.1 (cm) and less than 0.5 (cm) is judged by the CPU 11. Then, in the case that the track length data L is equal to or greater than 0.1 (cm) and less than 0.5 (cm), a command corresponding the track length data L, for example, a "run slowly" command is recognized in the CPU 11. Next, in the case that the track length data L is not equal to or greater than 0.1 (cm) and less than 0.5 (cm), whether or not the track length data L is equal to or greater than 0.5 (cm) and less than 1.0 (cm) is judged by the CPU 11. Then, in the case that the track length data L is equal to or greater than 0.5 (cm) and less than 1.0 (cm), a command corresponding the track length data L, for example, a "run normally" command is recognized in the CPU 11. Finally, in the case that the track length data L is not equal to or greater than 0.5 (cm) and less than 1.0 (cm), in other words, in the case that the track length data L is equal to or greater than 1.0 (cm), a command corresponding the track length data L, for example, a "run quickly" command is recognized in the CPU 11.

In addition, here, when the subsequent contact position of the touch pen 40 is continuously recognized in the CPU 11 in every 1/60 (sec), when the subsequent contact position of the touch pen 40 is no longer recognized in the CPU 11, the subsequent contact position of the touch pen 40 last recognized in the CPU 11 is recognized in the CPU 11 as the final contact position SE of the touch pen 40. Here, the subsequent contact position of the touch pen 40 first recognized in the CPU 11 has a coordinate of (x(1), y(1)), and the subsequent contact position of the touch pen 40 last recognized in the CPU 11 has a coordinate of (x(n_max), y(n_max)).

By doing so, when one command out of any of the plurality of commands assigned to the command icon is recognized in the CPU 11 (S13), this command is sent from the CPU 11. Then, an image showing the state corresponding to this command is displayed on at least one of the monitors of either the non-touch panel type of monitor 3a or the touch panel type of monitor 3b (S14). For example, when the CPU 11 sent out a command that makes the player character move, the movement image data of the player character is recognized by the CPU 11. Then, using this image data, the moving state of the player character is displayed on at least one of the monitors of either the non-touch panel type of monitor 3a or the touch panel type of monitor 3b.

Below, the command instruction system in the case that the "contacting speed" item is selected in Step 3 (in the case of Yes in Step 33) will be described. Here, parts of the same processes executed as described above will be given the same step numbers.

In the case that the "contacting speed" item is selected, for example, when the player touches the touch panel type of monitor 3b with the touch pen 40, the coordinate data of the contact start position SS on the touch panel type of monitor 3b, corresponding to the contact signal sent out from the touch panel type of monitor 3b is recognized in the CPU 11 (S7).

Next, whether or not the coordinate data of the contact start position SS on the touch panel type of monitor 3b matches the coordinate data inside one of the icons of any of the plurality of command icons 45 is judged by the CPU 11 (S8). For example, when the player positioned the touch pen 40 inside the display region of the command icon 45a, whether or not the X coordinate data of the contact start position SS on the touch panel type of monitor 3b is identical to the X component of a coordinate data inside the command icon 45a is judged by the CPU 11. Then, whether or not the Y coordinate data of the contact start position SS on the touch panel type of monitor 3b is identical to the Y component of a coordinate data inside the command icon 45a is judged by the CPU 11.

Then, when the CPU 11 judged that the coordinate data of the contact start position SS of the touch pen 40 matches the coordinate data inside one of the icons of any of the plurality of command icons 45 (Yes in S8), the coordinate data of the subsequent contact position showing the position touched by the touch pen 40, corresponding to the subsequent contact signal sent out from the touch panel type of monitor 3b following the contact start signal is recognized in the CPU 11 (S9). For example, when the CPU 11 judged that the X coordinate data of the contact start position SS on the touch panel type of monitor 3b is identical to one X coordinate data of any of the plurality of X coordinate data inside the command icon 45a, and that the CPU 11 judged that the Y coordinate data of the contact start position SS on the touch panel type of monitor 3b is identical to one Y coordinate data of any of the plurality of Y coordinate data inside the command icon 45a, the X coordinate data and the Y coordinate data of the subsequent contact position corresponding to the subsequent contact signal is recognized in the CPU 11.

Here, when the touch pen 40 touches the touch panel type of monitor 3b, a contact signal is sent out from the touch panel type of monitor 3b in every 1/60 (sec). Therefore, if the time TSo that the contact start signal is recognized in the CPU 11 is 0 (sec), the time TS that the next subsequent contact signal recognized in the CPU 11 following the contact start signal is 1/60 (sec). In other words, at the time TS, which is after 1/60 (sec) is passed from the time point TSo that the position coordinate data of the contact start position SS is recognized in the CPU 11, the coordinate data of the subsequent contact position of the touch pen 40 is recognized in the CPU 11.

In addition, the name subsequent contact signal used here is a term that refers to one of the signals of either a contact signal at the time after 1/60 (sec) is passed from the time To the contact start signal is sent from the touch panel type of monitor 3b, or a contact signal at the time after n/60 (sec) is passed from the time To the contact start signal is sent from the touch panel type of monitor 3b. In addition, "n" shown here is a natural number. Here, the subsequent contact signal is a contact signal at the time after 1/60 (sec) is passed from the time To the contact start signal is sent from the touch panel type of monitor 3b.

In addition, when the CPU 11 judged that the coordinate data of the contact start position SS of the touch pen 40 matches the coordinate data inside the command icon (Yes in S8), the fourth corresponding table that shows the corresponding relationship between the track formation speed data V and the command is recognized in the CPU 11 (S10c). In addition, this fourth corresponding table is prepared for each of the command icons 45a, 45b, 45c, 45d, 45e, 45f, 45g, and 45h. In FIG. 9, as an example of the fourth corresponding table, the fourth corresponding table in the case that the CPU 11 judged that the coordinate data of the contact start position SS of the touch pen 40 matches a coordinate data inside the command icon 45a is shown.

Next, whether or not the coordinate data of the subsequent contact position of the touch pen 40 matches the coordinate data of the contact start position SS of the touch pen 40 is judged by the CPU 11 (S11). For example, whether or not the X coordinate data of the subsequent contact position of the touch pen 40 is identical to the X coordinate data of the contact start position SS of the touch pen 40 is judged by the CPU 11. In addition, whether or not the Y coordinate data of the subsequent contact position of the touch pen 40 is identical to the Y coordinate data of the contact start position SS of the touch pen 40 is judged by the CPU 11.

Then, when the CPU 11 judged that the coordinate data of the subsequent contact position does not match the coordinate data of the contact start position SS of the touch pen 40 (No in S11), based on the coordinate data of the contact start position SS of the touch pen 40 and the coordinate data of the subsequent contact position of the touch pen 40, a process of calculating the length of the track from the contact start position SS of the touch pen 40 to the final contact position SE of the touch pen 40 is executed by the CPU 11. Then, the track length data L showing the length of this track is recognized in the CPU 11. In addition, a process of calculating the contacting time starting from the time the touch pen 40 touched the touch panel type of monitor 3b to the time the touch pen 40 separated from the touch panel type of monitor 3b is executed by the CPU 11. Then, a contacting time data T showing this contacting time is recognized in the CPU 11. Then, by having the CPU 11 execute a process of dividing the track length data L by the contacting time data T, the track formation speed is calculated. Then, the formation speed data V showing this track formation speed is recognized in the CPU 11 (S12c).

More specifically, after a player first touched the inside of the command icon with the touch pen 40, in the case that the touch pen 40 moved on the touch panel type of monitor 3b, based on the coordinate data (xo, yo) of the contact start position SS of the touch pen 40 and a plurality of coordinate data (xn, yn) of the subsequent contact position of the touch pen 40, a process (dLo=$\sqrt{((x(1)-xo)^2+(y(1)-yo)^2)}$, dL(n)=$\sqrt{((x(n)-x(n-1))^2+(y(n)-y(n-1))^2)}$, where n is a natural number that is equal to or greater than 2) of calculating intervals of the contact positions of the touch pen 40 is executed by the CPU 11. Then, a process (L=dLo+$\Sigma$dL(n): n=1 to n_max) of adding all intervals is executed by the CPU 11. By doing so, the track length data L showing the length of the track is calculated, and this track length data L is recognized in the CPU 11.

In addition, the process (T=TS(n_max)−TSo) of calculating the contacting time from the time TSo that the touch pen 40 started to be in contact with the touch panel type of monitor 3b to the time TS (n_max) that the touch pen 40 separated from the touch panel type of monitor 3b is executed by the CPU 11. Then, the contacting time data T showing this contacting time is recognized in the CPU 11. Then, by having the CPU 11 execute the process (V=L/T) of dividing the track length data L by the contacting time data T, the track formation speed is calculated. Then, the formation speed data V showing this track formation speed is recognized in the CPU 11.

Then, based on the formation speed data V recognized in the CPU 11, one command out of any of the plurality of commands, corresponding to this formation speed data V is recognized in the CPU 11. Here, the command corresponding to the track formation speed data V out of the plurality of commands, based on the fourth corresponding table, is recognized in the CPU 11 (S13).

For example, based on the formation speed data V recognized in the CPU 11, the range that this formation speed data V belongs to is recognized by the CPU 11. For example, first, when the unit of the formation speed data V is in "cm/sec", whether or not the formation speed data V less than 0.5 (cm/sec) is judged by the CPU 11. Then, in the case that the formation speed data V is less than 0.5 (cm/sec), a command corresponding to the formation speed data V, for example, a "run slowly" command is recognized in the CPU 11. Next, in the case that the formation speed data V is not less than 0.5 (cm/sec), whether or not the formation speed data V is equal to or greater than 0.5 (cm/sec) and less than 1.0 (cm/sec) is judged by the CPU 11. Then, in the case that the formation speed data V is equal to or greater than 0.5 (cm/sec) and less than 1.0 (cm/sec), a command corresponding to the formation speed data V, for example, a "run normally" command is recognized in the CPU 11. Finally, in the case that the formation speed data V is not equal to or greater than 0.5 (cm/sec) and less than 1.0 (cm/sec), in other words, in the case that the formation speed data V is equal to or greater than 1.0 (cm/sec), a command corresponding to the formation speed data V, for example, a "run quickly" command is recognized in the CPU 11.

In addition, here, when the CPU 11 continuously recognized the subsequent contact position of the touch pen 40 in every 1/60 (sec), when the CPU 11 no longer recognized the subsequent contact position of the touch pen 40, the subsequent contact position of the touch pen 40 last recognized in the CPU 11 is recognized in the CPU 11 as the final contact position SE of the touch pen 40. In addition, the time when the final contact position SE is recognized in the CPU 11 is recognized in the CPU 11 as the contact end time TS (n_max).

By doing so, when the CPU 11 recognized one command out of any of the plurality of commands assigned to the command icon (S13), this command is sent from the CPU 11. Then, an image showing the state corresponding to this command is displayed on at least one of the monitors of either the non-touch panel type of monitor 3a or the touch panel type of monitor 3b (S14). For example, when the CPU 11 sent out a command that makes the player character move, the movement image data of the player character is recognized by the CPU 11. Then, using this image data, the moving state of the player character is displayed on at least one of the monitors of either the non-touch panel type of monitor 3a or the touch panel type of monitor 3b.

Below, the command instruction system in the case that the "contacting time" item is selected in Step 3 (in the case of Yes in Step 34) will be described. Here, parts of the same processes executed as described above will be given the same step numbers.

In the case that the "contacting time" item is selected, for example, when the player touches the touch panel type of monitor 3b with the touch pen 40, the coordinate data of the contact start position SS on the touch panel type of monitor 3b, corresponding to the contact signal sent from the touch panel type of monitor 3b is recognized in the CPU 11 (S7).

Next, whether or not the coordinate data of the contact start position SS on the touch panel type of monitor 3b matches the coordinate data inside one of the icons of any of the plurality of command icons 45 is judged by the CPU 11 (S8). For example, in the case that the player positioned the touch pen 40 inside the display region of the command icon 45a, whether or not the X coordinate data of the contact start position SS on the touch panel type of monitor 3b is identical to the X component of a coordinate data inside the command icon 45a is judged by the CPU 11. Then, whether or not the Y coordinate data of the contact start position SS on the touch panel type of monitor 3b is identical to the Y component of a coordinate data inside the command icon 45a is judged by the CPU 11.

Then, when the CPU 11 judged that the coordinate data of the contact start position SS of the touch pen 40 matches a coordinate data inside one of the icons out of any of the plurality of the command icons 45 (Yes in S8), the coordinate data of the subsequent contact position that shows the position touched by the touch pen 40 corresponding to the subsequent contact signal sent out from the touch panel type of monitor 3b following the contact start signal is recognized in the CPU 11 (S9). For example, when the CPU 11 judged that the X coordinate data of the contact start position SS on the touch panel type of monitor 3b is identical to one X coordinate data of any of the plurality of X coordinate data inside the command icon 45a, and that the CPU 11 judged that the Y coordinate data of the contact start position SS on the touch panel type of monitor 3b is identical to one Y coordinate data of any of the plurality of Y coordinate data inside the command icon 45a, the X coordinate data and the Y coordinate data of the subsequent contact position corresponding to the subsequent contact signal is recognized in the CPU 11.

Here, when the touch pen 40 touched the touch panel type of monitor 3b, a contact signal is sent out from the touch panel type of monitor 3b in every 1/60 (sec). Therefore, if the time TSo that the contact start signal is recognized in the CPU 11 is 0 (sec), the time TS that the subsequent contact signal recognized in the CPU 11 following the contact start signal is 1/60 (sec). In other words, at the time TS, which is after 1/60 (sec) passed from the time point TSo that the position coordinate data of the contact start position SS is recognized in the CPU 11, the coordinate data of the subsequent contact position of the touch pen 40 is recognized in the CPU 11.

In addition, the name subsequent contact signal used here is a term that refers to a signal of either a contact signal at the time after 1/60 (sec) is passed from the time To the contact start signal is sent from the touch panel type of monitor 3b, or a contact signal at the time after n/60 (sec) is passed from the time To the contact start signal is sent from the touch panel type of monitor 3b. In addition, "n" shown here is a natural number. Here, the subsequent contact signal is a contact signal at the time after 1/60 (sec) is passed from the time To the contact start signal is sent from the touch panel type of monitor 3b.

In addition, when the CPU 11 judged that the coordinate data of the contact start position SS of the touch pen 40 matches the coordinate data inside the command icon (Yes in S8), the fifth corresponding table that shows the corresponding relationship between the contacting time data T and the command is recognized in the CPU 11 (S10d). In addition, this fifth corresponding table is prepared for each of the command icons 45a, 45b, 45c, 45d, 45e, 45f, 45g, and 45h. In FIG. 10, as an example of the fifth corresponding table, the fifth corresponding table in the case that the CPU 11 judged that the coordinate data of the contact start position SS of the touch pen 40 matches a coordinate data inside the command icon 45a is shown.

Next, whether or not the coordinate data of the subsequent contact position of the touch pen 40 matches the coordinate data of the contact start position SS of the touch pen 40 is judged by the CPU 11 (S11). For example, whether or not the X coordinate data of the subsequent contact position of the touch pen 40 is identical to the X coordinate data of the contact start position SS of the touch pen 40 is judged by the CPU 11. In addition, whether or not the Y coordinate data of the subsequent contact position of the touch pen 40 is identical to the Y coordinate data of the contact start position SS of the touch pen 40 is judged by the CPU 11.

Then, in the case that the CPU 11 judged that the coordinate data of the subsequent contact position of the touch pen 40 matches the coordinate data of the contact start position SS (Yes in S11), a process of calculating the contacting time starting from the time the touch pen 40 touched the touch panel type of monitor 3b to the time the touch pen 40 separated from the touch panel type of monitor 3b is executed by the CPU 11. Then, a contacting time data T showing this contacting time is recognized in the CPU 11 (S12d).

More specifically, after the player first touched inside the command icon with the touch pen 40, in the case that the touch pen 40 is kept at the position of contact and then separated from there, a process (T=TS(n_max)−TSo) of calculating the contacting time starting from the time TSo the touch pen 40 started to be in contact with the touch panel type of monitor 3b to the time TS (n_max) the touch pen 40 separated from the touch panel type of monitor 3b is executed by the CPU 11. Then, the contacting time data T that shows this contacting time is recognized in the CPU 11.

Then, based on the contacting time data T recognized in the CPU 11, one command out of any of the plurality of commands, corresponding to this contacting time data T, is recognized in the CPU 11. Here, the command corresponding to the contacting time data T out of the plurality of commands is recognized in the CPU 11 (S13), based on the fifth corresponding table.

For example, based on the contacting time data T recognized in the CPU 11, the range that this contacting time data T belongs to is recognized by the CPU 11. For example, first, when the unit of the contacting time data T is in "sec", whether or not the contacting time data T less than 1.0 (sec) is judged by the CPU 11. Then, in the case that the contacting time data T is less than 1.0 (sec), a command corresponding to the contacting time data T, for example, a "run slowly" command is recognized in the CPU 11. Next, in the case that the contacting time data T is not less than 1.0 (sec), whether or not the contacting time data T is equal to or greater than 1.0 (sec) and less than 3.0 (sec) is judged by the CPU 11. Then, in the case that the contacting time data T is equal to or greater than 1.0 (sec) and less than 3.0 (sec), a command corresponding to the contacting time data T, for example, a "run normally" command is recognized in the CPU 11. Finally, in the case that the contacting time data T is not equal to or greater than 1.0 (sec) and less than 3.0 (sec), in other words, in the case that the contacting time data T is equal to or greater than 3.0 (sec), a command corresponding to the contacting time data T, for example, a "run quickly" command is recognized in the CPU 11.

In addition, here, when the subsequent contact position of the touch pen 40 is continuously recognized in the CPU 11 in every 1/60 (sec), when the subsequent contact position of the touch pen 40 is no longer recognized in the CPU 11, the subsequent contact position of the touch pen 40 last recognized in the CPU 11 is recognized in the CPU 11 as the final contact position SE of the touch pen 40. The time when this final contact position SE is recognized in the CPU 11 is recognized in the CPU 11 as the contact end time TS (n_max). By doing so, it is possible to calculate the contacting time from the contact start time TSo to the contact end time TS (n_max).

By doing so, when one of the commands out of any of the plurality of commands assigned to the command icon is recognized in the CPU 11 (S13), this command is sent out from the CPU 11. Then, an image showing the state corresponding to this command is displayed on at least one of the monitors of either the non-touch panel type of monitor 3a or the touch panel type of monitor 3b (S14). For example, when the CPU 11 sent out a command that makes the player character move, a movement image data of the player character is recognized by the CPU 11. Then, using this image data, the moving state of the player character is displayed on at least one of the monitors of either the non-touch panel type of monitor 3a or the touch panel type of monitor 3b.

Below, the command instruction system in the case that the "contact frequency" item is selected in Step 3 (in the case of Yes in Step 35) will be described. Here, parts of the same processes executed as described above will be given the same step numbers.

In the case that the "contact frequency" item is selected, for example, when the player touched the touch panel type of monitor 3b with the touch pen 40, the coordinate data of the contact start position SS on the touch panel type of monitor 3b, corresponding to the contact signal sent out from the touch panel type of monitor 3b is recognized in the CPU 11 (S7).

Next, whether or not the coordinate data of the contact start position SS on the touch panel type of monitor 3b matches the coordinate data inside one of the icons out of any of the plurality of command icons 45 is judged by the CPU 11 (S8). For example, when a player positioned the touch pen 40 inside the display region of the command icon 45a, whether or not the X coordinate data of the contact start position SS on the touch panel type of monitor 3b is identical to an X component of a coordinate data inside the command icon 45a is judged by the CPU 11. Then, whether or not the Y coordinate data of the contact start position SS on the touch panel type of monitor 3b is identical to a Y component of a coordinate data inside the command icon 45a is judged by the CPU 11.

Then, when the CPU 11 judged that the coordinate data of the contact start position SS of the touch pen 40 matches a coordinate data inside one of the icons out of any of the plurality of the command icons 45 (Yes in S8), the coordinate data of the subsequent contact position that shows the position touched by the touch pen 40 corresponding to the subsequent contact signal sent out from the touch panel type of monitor 3b following the contact start signal is recognized in the CPU 11 (S9). For example, when the CPU 11 judged that the X coordinate data of the contact start position SS on the touch panel type of monitor 3b is identical to one X coordinate data of any of the plurality of X coordinate data inside the command icon 45a, and that the CPU 11 judged that the Y coordinate data of the contact start position SS on the touch panel type of monitor 3b is identical to one Y coordinate data of any of the plurality of Y coordinate data inside the command icon 45a, the X coordinate data and the Y coordinate data of the subsequent contact position corresponding to the subsequent contact signal is recognized in the CPU 11.

In addition, the name subsequent contact signal used here refers to, with the contact start signal at the time TSo sent from the touch panel type of monitor 3b as the standard, a contact signal sent from the touch panel type of monitor 3b after this time TSo.

In addition, when the CPU 11 judged that the coordinate data of the contact start position SS of the touch pen 40 matches the coordinate data inside the command icon (Yes in S8), the sixth corresponding table that shows the corresponding relationship between the contact frequency data and the command is recognized in the CPU 11 (S10e). In addition, this sixth corresponding table is prepared for each of the command icons 45a, 45b, 45c, 45d, 45e, 45f, 45g, and 45h. In FIG. 11, as an example of the sixth corresponding table, the sixth corresponding table in the case that the CPU 11 judged that the coordinate data of the contact start position SS of the touch pen 40 matches a coordinate data inside the command icon 45a is shown.

Next, whether or not the coordinate data of the subsequent contact position of the touch pen 40 is intermittently recognized in the CPU 11 is judged by the CPU 11 (S15). For example, whether or not the coordinate data of the subsequent contact position of the touch pen 40 is recognized in the CPU 11 outside the range of a predetermined time interval is judged by the CPU 11. More specifically, whether or not the coordinate data of the subsequent contact position of the touch pen 40 is recognized in the CPU 11 outside the range of the standard time interval that the CPU 11 recognizes signals, for example at a time interval greater than 1/60 (sec), is judged by the CPU 11.

Then, in the case that the subsequent contact position of the touch pen 40 is recognized in the CPU 11 at a time interval greater than 1/60 (sec) (Yes in S15), a process of calculating the contact frequency of the touch pen 40 on the touch panel type of monitor 3b is executed by the CPU 11. For example, in this case, when the coordinate data of a subsequent contact position of the touch pen 40 is recognized in the CPU 11, a process of incrementing the value of the contact frequency parameter SP in increments of one is executed by the CPU 11. Then, when the coordinate data of the final contact position SE of the touch pen 40 is recognized in the CPU 11, a command for terminating the process of incrementing the value of the contact frequency parameter SP is sent out from the CPU 11. By doing so, the process of calculating the contact frequency of the touch pen 40 is terminated. Then, the value of the contact frequency parameter SP is recognized in the CPU 11 as the contact frequency data (S16). In addition, when the coordinate data of the contact start position SS of the touch pen 40 is recognized in the CPU 11, an initial value, for example "1", is assigned to the contact frequency parameter SP by the CPU 11.

Then, based on the contact frequency data recognized in the CPU 11, one command out of any of the plurality of commands, corresponding to this contact frequency data, is recognized in the CPU 11. Here, the command corresponding to the contact frequency data out of the plurality of commands is recognized in the CPU 11 (S17), based on the sixth corresponding table.

For example, based on the contact frequency data recognized in the CPU 11, the range that this contact frequency data belongs to is recognized by the CPU 11. For example, first, whether or not the contact frequency data is less than 2 (times) is judged by the CPU 11. Then, in the case that the contact frequency data is less than 2 (times), a command corresponding to the contact frequency data, for example, a "run slowly" command is recognized in the CPU 11. Next, in the case that the contact frequency data is not less than 2 (times), whether or not the contact frequency data is equal to or greater than 2 (times) and less than 3 (times) is judged by the CPU 11. Then, in the case that the contact frequency data is equal to or greater than 2 (times) and less than 3 (times), a command corresponding to the contact frequency data, for example, a "run normally" command is recognized in the CPU 11. Finally, in the case that the contact frequency data is not equal to or greater than 2 (times) and less than 3 (times), in other words, in the case that the contact frequency data is equal to or greater than 3 (times), a command corresponding to the contact frequency data, for example, a "run quickly" command is recognized in the CPU 11.

In addition, here, when the subsequent contact position of the touch pen 40 is intermittently recognized in the CPU 11, in the case that after a standard time that the CPU 11 ignores signals, for example 2.0 (sec) or more, is passed, the subsequent contact position of the touch pen 40 last recognized in the CPU 11 is recognized in the CPU 11 as the final contact position SE of the touch pen 40.

By doing so, when one command out of any of a plurality of commands assigned to the command icon is recognized in the CPU 11 (S17), this command is sent from the CPU 11. Then, an image showing the state corresponding to this command is displayed on at least one of the monitors of either the non-touch panel type of monitor 3a or the touch panel type of monitor 3b (S18). For example, when the CPU 11 sent out a command that makes the player character move, a movement image data of the player character is recognized by the CPU 11. Then, using this image data, the moving state of the player character is displayed on at least one of the monitors of either the non-touch panel type of monitor 3a or the touch panel type of monitor 3b.

In the above kind of the embodiment here, a player is able to select from a plurality of commands assigned to the command icon, by only positioning the touch pen 40 inside the command icon only once at the beginning. Then, the player is able to select the intended command from the plurality of commands, by controlling the touch pen 40 on the touch panel type of monitor 3b, in the command instruction form corresponding to the selected item. In other words, it is possible to select the intended command from the plurality of commands, by positioning the touch pen 40 inside or outside the command icon after positioning the touch pen 40 inside the command icon only once at the beginning. This way, the player is able to instruct smoothly the intended command from the command icon.

Other Embodiments (a) In the embodiment described above, an example in the case that a home video game device, as an example of a computer that is able to adopt the game program, is used is shown. However, the game device is not limited to the above described embodiment, and it is possible to adopt likewise a game device configured to have a monitor that is a separate body, a game device configured with the monitor thereof integrated, a personal computer or a workstation or the like that functions as a game device by executing the game program. In addition, the game device is not limited to the above described embodiment, and it is possible to adopt likewise a portable computer, a portable game device, and the like.

(b) The present invention also includes a program that executes the above described kind of game, and a machine-readable recording media in which this program is recorded. As the recording media, other than the cartridge, for example, it may include a machine-readable flexible disk, a semiconductor memory, a CD-ROM, a DVD, an MO, a ROM cassette, and the like.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer-readable medium storing a game program for executing commands inputted from a contact input type monitor, the game program comprising:
   code for displaying a command input region on the contact input type monitor;
   code for assigning the commands to the command input region;
   code for recognizing a contact signal sent from the contact input type monitor, when a user contacts the contact input type monitor by the instruction device;
   code for recognizing a contact start signal sent from the contact input type monitor, the contact start signal corresponding to a coordinate datum of a contact start position where the user starts inputting the commands on the contact input type monitor by the instruction device;
   code for judging whether or not the contact start position is within the command input region;
   code for recognizing a subsequent contact signal sent from the contact input type monitor, the subsequent contact signal following the contact start signal and corresponding to a coordinate datum of a subsequent contact position where the user stops inputting the commands on the contact input type monitor by the instruction device, when the contact start position is within the command input region;
   code for judging whether or not the subsequent contact position is same as the contact start position;
   code for recognizing a track specified between the contact start position and the subsequent contact position, when subsequent contact position is not same as the contact start position; and
   code for selecting and executing at least one of the commands, based on the track.

2. The non-transitory computer-readable medium storing a game program as recited in claim 1, wherein
   the subsequent contact position is within the command input region.

3. The non-transitory computer-readable medium storing a game program as recited in claim 1, wherein
   the subsequent contact position is outside of the command input region.

4. The non-transitory computer-readable medium storing a game program as recited in claim 1, further comprising
   code for recognizing length of the track specified between the contact start position and the subsequent contact position, when the subsequent contact position is different from the contact start position, and
   code for selecting and executing at least one of the commands, based on the length of the track.

5. The non-transitory computer-readable medium storing a game program as recited in claim 4, wherein
   the subsequent contact position is within the command input region.

6. The non-transitory computer-readable medium storing a game program as recited in claim 4, wherein
   the subsequent contact position is outside of the command input region.

7. The non-transitory computer-readable medium storing a game program as recited in claim 1, further comprising
   code for recognizing speed of forming the track specified between the contact start position and the subsequent contact position, when the subsequent contact position is different from the contact start position, and
   code for selecting and executing at least one of the commands, based on the speed of forming the track.

8. The non-transitory computer-readable medium storing a game program as recited in claim 7, wherein
   the subsequent contact position is within the command input region.

9. The non-transitory computer-readable medium storing a game program as recited in claim 7, wherein
   the subsequent contact position is outside of the command input region.

10. The non-transitory computer-readable medium storing a game program as recited in claim 1, further comprising
    code for recognizing contacting time of the instruction device on the contact input type monitor, when the subsequent contact position is same as the contact start position, and
    code for selecting and executing at least one of the commands, based on the contacting time.

11. A non-transitory computer-readable medium storing a game program for executing commands inputted from a contact input type monitor, the game program comprising:
    code for displaying a command input region on the contact input type monitor;
    code for assigning the commands to the command input region;
    code for recognizing a contact signal from the contact input type monitor, when the user contacts the contact input type monitor by the instruction device;

code for recognizing a contact start signal sent from the contact input type monitor, the contact start signal corresponding to a coordinate datum of a contact start position where the user starts inputting the commands on the contact input type monitor by the instruction device;

code for judging whether or not the coordinate data of the contact start position is within the command input region;

code for recognizing a subsequent contact signal sent from the contact input type monitor, the subsequent contact signal following the contact start signal and corresponding to a coordinate datum of a subsequent contact position where the user stops contacting on the contact input monitor by the instruction device, when the contact start position is within the command input region;

code for judging whether or not the subsequent contact position on the contact input type monitor is intermittently recognized;

code for calculating how may of the contact start position and the subsequent contact position, when the subsequent contact position on the contact input type monitor is intermittently recognized; and code for selecting and executing at least one of the commands, based on how many of the contact start position or the subsequent contact position is recognized.

12. A game device that has a contact input type monitor and executes a command inputted by a user from the contact input type monitor, the game device comprising:

a command input region display device displaying a command input region on the contact input type monitor where the user inputs the commands by using an instruction device;

a command assignment device assigning the commands to the command input region;

a signal recognition device recognizing a contact signal from the contact input type monitor, when the user contacts on the contact input type monitor by the instruction device;

a contact start position recognition device recognizing a contact start signal sent from the contact input type monitor, the contact start signal corresponding to a coordinate datum of a contact start position where the user starts inputting the commands on the contact input type monitor by the instruction device;

a contact start position judgment device judging whether or not the contact start position is within the command input region;

a subsequent contact position recognition device recognizing a subsequent contact signal sent from the contact input type monitor, the subsequent contact signal following the contact start signal and corresponding to a coordinate datum of a subsequent contact position where the user stops inputting the commands on the contact input type monitor by the instruction device, when the contact start position is within the command input region;

a subsequent contact position judgment device judging whether or not the subsequent contact position is same as the contact start position;

a track recognition device recognizing a track specified between the contact start position and the subsequent contact position, when the subsequent contact position is different from the contact start position; and a track command recognition device selecting and executing one of the of commands, based on the track.

13. A game control method for executing commands, comprising:

preparing a game device having a contact input type monitor;

preparing a instruction device;

displaying a command input region on the contact input type monitor where a user inputs the commands by using the instruction device;

assigning the commands to the command input region;

recognizing a contact signal from the contact input type monitor, when the user contacts the contact input type monitor by the instruction device;

recognizing a contact start signal sent from the contact input type monitor, the contact start signal corresponding to a coordinate datum of a contact start position where the user starts inputting the commands on the contact input type monitor by the instruction device;

judging whether or not the contact start position is within the command input region;

recognizing a subsequent contact signal sent from the contact input type monitor, the subsequent contact signal following the contact start signal and corresponding a coordinate datum of a subsequent contact position where the user stops inputting the commands on the contact input type monitor by the instruction device, when the contact start position is within the command input region;

judging whether or not the subsequent contact position is same as the contact start position;

recognizing a track specified between the contact start position and the subsequent contact position, when the subsequent contact position is the contact start position; and selecting and executing one of the commands, based on the track.

* * * * *